United States Patent
Barta et al.

(10) Patent No.: US 7,395,962 B2
(45) Date of Patent: *Jul. 8, 2008

(54) PICK UP NOTICE AND METHOD OF USING SAME

(75) Inventors: Craig M. Barta, Alpharetta, GA (US);
Scott Aubuchon, Alpharetta, GA (US);
James J. Fleckenstein, Duluth, GA (US); Daniel Garcia, Norcross, GA (US); Matthew T. Miller, Cumming, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/260,998

(22) Filed: Oct. 28, 2005

(65) Prior Publication Data

US 2007/0095904 A1 May 3, 2007

(51) Int. Cl.
*G07B 15/02* (2006.01)
(52) U.S. Cl. .................. 235/384; 235/375; 235/385
(58) Field of Classification Search ............... 235/375, 235/384–385; 705/22; 358/400
See application file for complete search history.

(56) References Cited

U.S. PATENT DOCUMENTS

| 4,556,944 | A |  | 12/1985 | Daniels et al. |
| 4,921,107 | A |  | 5/1990 | Hofer |
| 5,208,449 | A |  | 5/1993 | Eastman et al. |
| 5,263,118 | A |  | 11/1993 | Cornelison |
| 5,305,244 | A |  | 4/1994 | Newman et al. |
| 5,362,949 | A |  | 11/1994 | Gulick |
| 5,677,834 | A |  | 10/1997 | Mooneyham |
| 5,869,819 | A |  | 2/1999 | Knowles et al. |
| 6,021,942 | A |  | 2/2000 | Monico |
| 6,400,829 | B1 |  | 6/2002 | Petkovek |
| 6,634,551 | B2 | * | 10/2003 | Barta et al. .................. 235/385 |

(Continued)

FOREIGN PATENT DOCUMENTS

JP 05-165847 7/1993

(Continued)

OTHER PUBLICATIONS

International Search Report and Written Opinion for corresponding International Application No. PCT/US2006/32097; mailed Oct. 4, 2007; 13 pages.

*Primary Examiner*—Lisa M Caputo
(74) *Attorney, Agent, or Firm*—Alston & Bird LLP

(57) ABSTRACT

Generally described, the invention provides for an indicia that is associated with a pick up notice left at a pick up location. This indicia is "linked" to the parcel(s) that were intended for pick up at the location, which may be done by a handheld portable data acquisition device that includes a scanning or reading means, allowing information to be acquired from the pick up notice as well as from the parcels, and stored on the handheld portable data acquisition device. Parcel's that do not comply with a carrier's business rules are left at the business location, along with the pick up notice. The indicia is then used to access information about the parcels that were left behind and arrange for re-pick up or alternate pick up instructions, including canceling pick up. The indicia may also be used to track parcels that were picked up as well as to make alternate delivery arrangements for the picked up parcels.

26 Claims, 17 Drawing Sheets

U.S. PATENT DOCUMENTS

| | | |
|---|---|---|
| 6,902,109 B2 * | 6/2005 | Barta et al. ................. 235/385 |
| 2002/0035557 A1 | 3/2002 | Nagahara |
| 2002/0138173 A1 | 9/2002 | Barta et al. |
| 2003/0037009 A1 | 2/2003 | Tobin et al. |
| 2003/0110170 A1 | 6/2003 | Matsuoka |

FOREIGN PATENT DOCUMENTS

| | | |
|---|---|---|
| JP | 08-307545 | 11/1996 |
| JP | 11-175621 | 7/1999 |
| WO | WO 01/86542 A2 | 11/2001 |
| WO | WO 01/99037 | 12/2001 |
| WO | WO 02/08994 | 1/2002 |
| WO | WO 02/21421 A1 | 3/2002 |

* cited by examiner

Service Attempts:
UPS makes up to three delivery attempts (excluding Sat./Sun. & holidays).
To prevent your package from being returned to sender, call 1-800-833-9943 and arrange for pickup.
Delivery change requests must be made prior to 7:00 p.m.
Except for C.O.D.s, UPS will hold your package for five business days after final delivery attempt.
UPS automatically returns all C.O.D. packages to sender the same day the final delivery attempt is made.

Signatures Required:
If the "Signature required on delivery" box is checked, the driver must receive a signature and hand the package to a person.
If the "Adult signature required on delivery" box is checked, the driver must receive an adult signature and hand the package to the adult (min. 21 years of age).

C.O.D. Check Requirements:
When the "Cashier's check, official bank check or money order only" box is marked, UPS has been instructed by the sender to accept only these methods of payment, payable to sender.

Customer Comments:
To have package delivered to a neighbor, write details in this section. (Does not apply to "Adult signature required" deliveries.)

Sign To Have Package Delivered (When Checked):
When the "Sign to have package delivered" box is checked, you can authorize the driver to leave the package. Sign below and return the notice to original location.

Your signature _____

Print name _____

FIG. 4B

InfoNotice Package List

InfoNotice Tracking Detail

Delivery Notice System Flow Bar-Coded UPS.COM Version

PICK UP NOTICE AND METHOD OF USING SAME

BACKGROUND OF THE INVENTION

1. Field of the Invention

The present invention generally relates to the pick-up and delivery of items, and particularly relates to the attempted pick-up of items such as parcels (a.k.a. "packages") from a shipper by a delivery service provider (hereinafter "delivery service"), for delivery to an intended recipient (a.k.a. "consignee").

2. Description of Related Art

The pick-up of parcels and other items from a shipper and delivery of the parcels and other items to the residence or other location of intended recipients is known in the art. In many instances, when a parcel is undeliverable, a "delivery notice" is left at the particular location, and the intended recipient then has the opportunity to contact the delivery service (e.g., UPS) via telephone or the Internet and arrange to have the package(s) redelivered, held at a local operation center, redirected, or returned. However, no such parallel system exists for items that are to be picked-up by the delivery service but such pick-up is prevented or impeded in some manner.

Presently, if a shipper has left unattended items to be picked-up by a delivery service and such items are not picked up, the shipper may have no means for knowing the reason the items were not retrieved by the delivery service or even whether the delivery service attempted pick-up. Furthermore, once items have been picked up, there is no mechanism that identifies all the items picked up at a location. If provided with a package tracking number, a shipper may have to access shipping records about each individual package picked up at a specific location by the delivery service.

Furthermore, if a shipper has left unattended items for shipment at a location and such items are found later to be missing, there is no assurance that the items have been properly retrieved by the delivery service or whether the items have been dealt a more insidious fate. A shipper may have to contact the carrier to determine if all the packages have been picked up or individually contact each intended recipient to find out if they received their parcel(s). As may be understood, such activities are labor intensive.

In light of the foregoing, it may be seen that there is a need in the art to provide an improved method for providing package or other item pick-up that is less labor intensive than the methods described above and that addresses deficiencies in the art, some of which are described above

BRIEF SUMMARY OF THE INVENTION

The embodiments of the present invention provide a system and method to link a notice such as, for example, a pick-up notice having one or more indicia with information about a pick-up location and information about the pick-up or failure to pick-up any items at the pick-up location. If items are picked-up at the pick-up location, then the pick-up notice is linked to item information. The pick-up notice is left at the pick-up location by a delivery service. The shipper may use the pick-up notice to contact the delivery service and obtain information about the pick-up, attempted pick-up, or partial pick-up. Such information includes information about the stop attempt (e.g., attempt number, time and date of the attempted pick-up, etc.); the number of packages that the driver picked up (if any); the number of packages that the driver could not accept/pickup due to problems (if any); specific detail as recorded by the driver for each package whether picked up or not, including no standard register book (SRB) or manifest to sign for to account for packages, improper packaging, prohibited items (hazardous materials, etc.), size and/or weight limit exceptions, etc. If one or more of the items to be picked up are international shipments, then information about the stop attempt may include whether one or more of the items have missing account numbers or payments (credit card number or check), incomplete multiple, incomplete waybills, missing documentation (invoice, value declaration, country of origin, description of goods), etc. A "multiple" is a planned or anticipated pick up of more than one parcel by a carrier and one (or more) of the parcels in the shipment is missing (not available at time of pickup by the driver), then generally the entire shipment is not picked up by the driver. A "waybill" as used in this context is a shipping document that provides shipment details including destination, shipper, and type of delivery service and is part of a shipping contract (an agreement between a shipper and the carrier). For example, the UPS Air Shipping Document (ASD) is a three-part waybill form used to ship air packages. The ASD contains the address label, tracking label, and shipping record. It allows several payment options, including a bank check, major credit card or a UPS-issued billing information number.

In another aspect of the invention, a shipper may use either human-readable and/or machine-readable indicia on the pick-up notice to track items that have been picked-up and linked to that pick up notice and, with proper authorization, to have certain information about the shipped items changed, edited, completed, deleted or modified, including redirecting the shipped packages.

In another aspect, a UPS InfoNotice™ pick-up and delivery notice is linked to a pick-up stop (and linked to packages that are to be shipped at that stop) to provide information to a customer (commercial or residential shipper) or an intended recipient about the stop and packages and to allow an authorized person to change, edit, complete, delete or modify information about the shipped items including redirecting the shipped packages.

Another aspect of the present invent is a system for picking up one or more unique items from a shipper each item having a unique identity and each having a different machine-readable item code readable therefrom. The system is comprised of a plurality of pick up notices, each pick up notice includes a machine-readable pick up notice code and each of the pick up notice codes being unique within the plurality of pick up notices. The system further includes a code-reading device configured to read the machine-readable pick up notice code from one of the pick up notices as well as to read the machine-readable item code from each of the one or more items such that a pick up notice code is read and one or more item codes are read. The system further includes a code storing and linking device, that is configured to store the pick up notice code and the one or more item codes and is also configured to provide a link between the pick up notice code and the one or more item codes.

Yet another aspect of the present invention is a system for picking up one or more unique items from a shipper each item having a unique identity and each having a different machine-readable item code readable therefrom. The system is comprised of a plurality of pick up notices each including a machine-readable pick up notice code and each pick up notice code being unique within the plurality of pick up notices. The system includes a code-reading and storing device configured to read the machine-readable pick up notice code from one of the pick up notices, to read the machine-readable item code from each of the one or more items and to store the pick up notice code and the one or more item codes. The system further includes a storing and serving device configured to receive information relating to the pick up notice code and the one or more item codes from the code-reading and storing device. The storing and serving device is also configured to provide information upon request relating to the one or more items, including a status that indicates whether each of the one or more items was left behind or picked up, upon the receipt of information relating to the pick up notice.

Another aspect of the present invention is a system for picking up one or more unique items each item having a unique identity and each having a different machine-readable item code readable therefrom. The system is comprised of a plurality of pick up notices, each including a machine-readable pick up notice code and each pick up notice code being unique within the plurality of pick up notices. The system includes a code-reading and storing device configured to read the machine-readable pick up notice code from one of the pick up notices, read the machine-readable item code from each of the one or more items, and to store the pick up notice code and the one or more item codes. The system further includes a storing linking and serving device configured to receive information relating to the pick up notice code and the one or more item codes from the code-reading and storing device, and to link the pick up notice code relative to the one or more item codes to allow it to provide information upon request relating to the one or more unique items. The information includes a status that indicates whether each of the one or more items was left behind or picked up, upon the receipt of information relating to the pick up notice.

Yet another aspect of the invention is a system for picking up one or more unique items from a shipper each item having a unique identity and each having a different machine-readable item code readable therefrom. The system is comprised of a plurality of pick up notices each including a first machine-readable pick up notice code and a second human-readable pick up notice code thereon and each of the pick up notice codes being unique within the plurality of pick up notices. The system includes a code-reading device that is configured to read the machine-readable pick up notice code from one of the pick up notices and to read the machine-readable item code from each of said one or more items. The system also includes a code-storing device that is configured to store the pick up notice code and the one or more item codes; and a linking device that is configured to link the pick up notice relative to the one or more items. The system further includes a reporting device configured to report information regarding each of the one or more unique items. The information includes a status that indicates whether each of the one or more unique items was left behind or picked up, in response to receipt of the second human-readable notice code.

Another aspect of the present invention is a method for picking up one or more unique items from a shipper each item having a unique identity and each having a different machine-readable item code readable therefrom. This method includes the steps of providing a plurality of pick up notices each including a machine-readable pick up notice code thereon and each pick up notice code being unique within the plurality of pick up notices. Next, machine reading the machine-readable pick up notice code from one of the pick notices and storing corresponding electronic data associated with the machine-readable pick up notice code; and machine reading the machine-readable item code from each of the one or more items and storing electronic data associated with the one or more item where the electronic data includes a status that indicates whether each of the one or more items was picked up by the carrier. Then, electronically linking the electronic data associated with the machine-readable pick up notice code with the electronic data associated with the one or more items.

Another aspect of the present invention is a method for picking up one or more unique items from a shipper each item having a unique identity and each having a different machine-readable item code readable therefrom. The method includes the steps of providing a plurality of pick up notices each including a machine-readable pick up notice code thereon and each pick up notice codes being unique within the plurality of pick up notices. Next, machine reading the machine-readable pick up notice code from one of the pick up notices and storing corresponding electronic data associated with the machine-readable pick up notice code and also machine reading the machine-readable item code from each of the one or more items, and storing electronic data associated with the one or more items. The next step is electronically linking the electronic data associated with the machine-readable pick up notice code with the electronic data associated with the one or more items. Then, reporting information regarding each of the one or more unique items in response to receipt of a description of said one of the pick up notices where the information includes a status that indicates whether each of the one or more items was picked up by the carrier.

Yet another aspect of the present invention is a method for picking up one or more unique items each having unique identities and each having a different machine-readable item code readable therefrom. This method included the steps of providing a plurality of pick up notices each including a machine-readable first pick up notice code and a human-readable second pick up notice code thereon, and each first pick up notice code being unique within the plurality of pick up notices. Then machine reading the machine-readable pick up notice code from one of the pick up notices and storing corresponding electronic data associated with the machine-readable pick up notice code, and machine reading the machine-readable item code from each of the one or more items and storing electronic data associated with the one or more items. Next, electronically linking the electronic data associated with the machine-readable pick up notice code with the electronic data associated with the one or more items. Finally, reporting information regarding each of the one or more unique items in response to receipt of the human-readable second pick up notice code, where the information includes a status that indicates whether each of the one or more items was picked up by the carrier.

Another aspect of the invention is a method for one or more unique items from one or more shippers each item having a unique identity and each having a different machine-readable item code readable therefrom. This method includes the use of a handheld data acquisition device and is comprised of the steps of providing a plurality of pick up notices each including a machine-readable pick up notice code and each of the pick up notice codes being unique within the plurality of pick up notices. Next, machine reading the machine-readable pick up notice code from one of the pick up notices and storing corresponding electronic data associated with the machine-readable pick up notice code on the handheld data acquisition device, and machine reading the machine-readable item code from each of the one or more items and storing electronic data associated with the one or more items on the handheld data acquisition device. Then, electronically linking said electronic data associated with said machine-readable pick up notice code with said electronic data associated with said one or more items. The next step is reporting information regarding each of the one or more unique items in response to receipt of a description of one of the pick up notices, where the information includes a status that indicates whether each of the one or more items was picked up by the carrier.

Yet another aspect of the invention is a method for picking up one or more unique items from a shipping location each item having a unique identity and each having a different machine-readable item code readable therefrom. The method includes the use of a handheld data acquisition device and a computer server and is comprised of the steps of providing a plurality of pick up notices, each including a machine-readable pick up notice code and each of pick up notice code being unique within the plurality of pick up notices. Then, machine reading the machine-readable pick up notice code from one of the pick up notices and storing corresponding electronic data associated with the machine-readable pick up notice code on the handheld data acquisition device, and machine reading the machine-readable item code from each of the one or more items and storing electronic data associated with the one or more items on the handheld data acquisition device. Next, transferring the electronic data associated with the machine-readable pick up notice code from the handheld data acquisition device to the server as well as transferring the electronic data associated with the one or more items from the handheld data acquisition device to the server. Next, electronically linking the electronic data on the server associated with the machine-readable pick up notice code with the electronic data on the server associated with the one or more of items. Then, reporting information regarding each of the one or more items in response to receipt of a description of the one of said pick up notices, where the information includes a status for each of the one or more items indicating whether the item was picked up from the shipping location.

Another aspect of the present invention is a method for picking up, from a shipping location, one or more unique items each having a unique identity and each having a different machine-readable item code readable therefrom. The method includes the steps of providing a plurality of pick up notices each including a machine-readable pick up notice code, each of the pick up notice codes being unique within the plurality of pick up notices. Then, attempting the pick up of the one or more unique items at the shipping location under a set of predetermined business rules and picking up each of the items if each item meets the business rules. If an item does not meet the business rules, then the item is left at the shipping location. Then, machine reading the machine-readable pick up notice code from one of the pick up notices and storing corresponding electronic data associated with the machine-readable pick up notice code and machine reading the machine-readable item code from each of the items and storing electronic data associated with the one or more items. Next, electronically linking the electronic data associated with the machine-readable pick up notice code with the electronic data associated with the machine-readable item code from each of the one or more items. Then, reporting information regarding each of the one or more items in response to receipt of a description of one of the pick up notices from a shipper where the information includes a status for each of the one or more items indicating whether the item was picked up from the pick up location. Then modifying pick up plans for one or more items each having status that indicates the items were left at the shipping location based upon subsequent instructions from the shipper.

These and other aspects of the present invention are more fully described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
Figure 5:
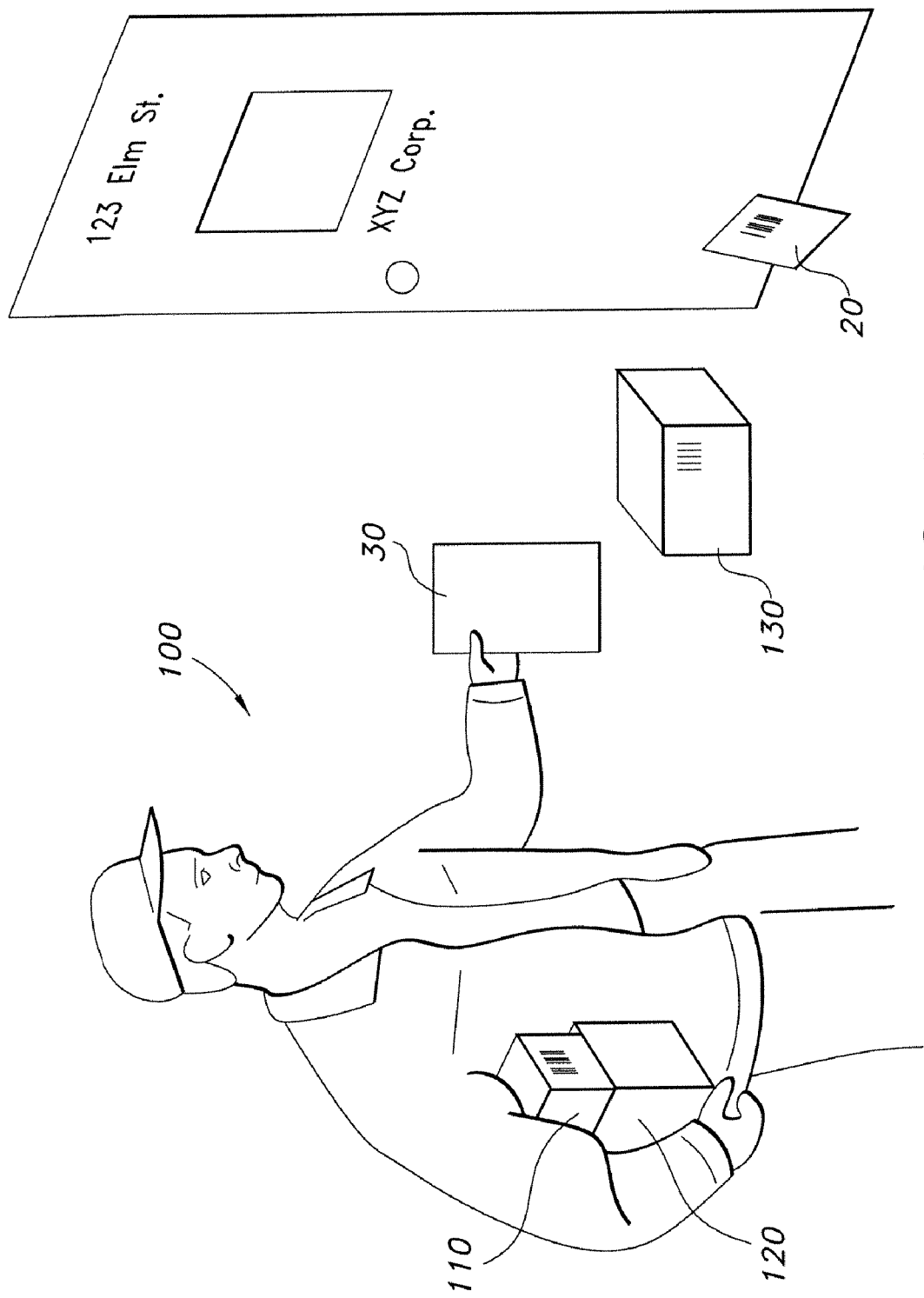
Figure 6:
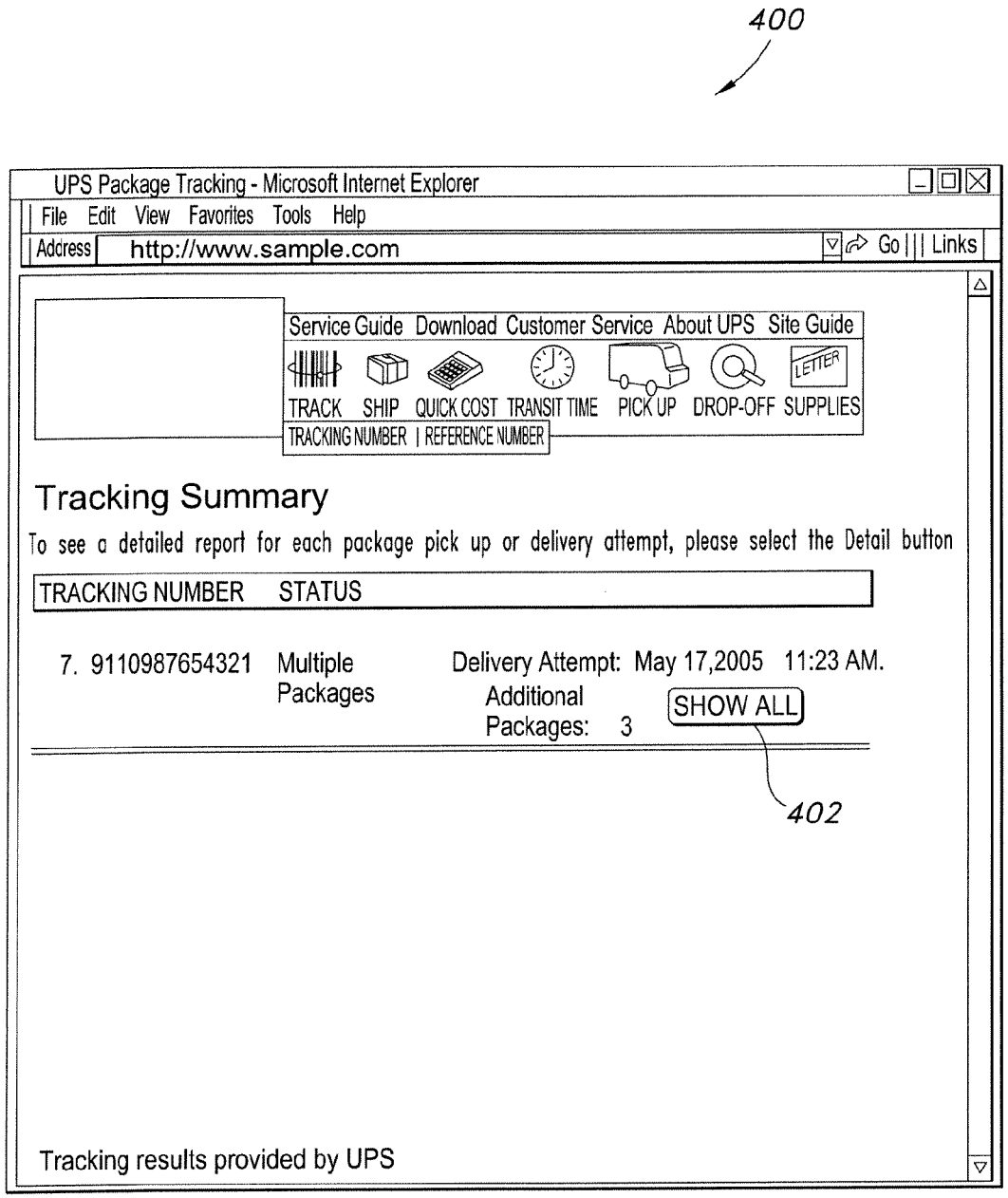
Figure 7:
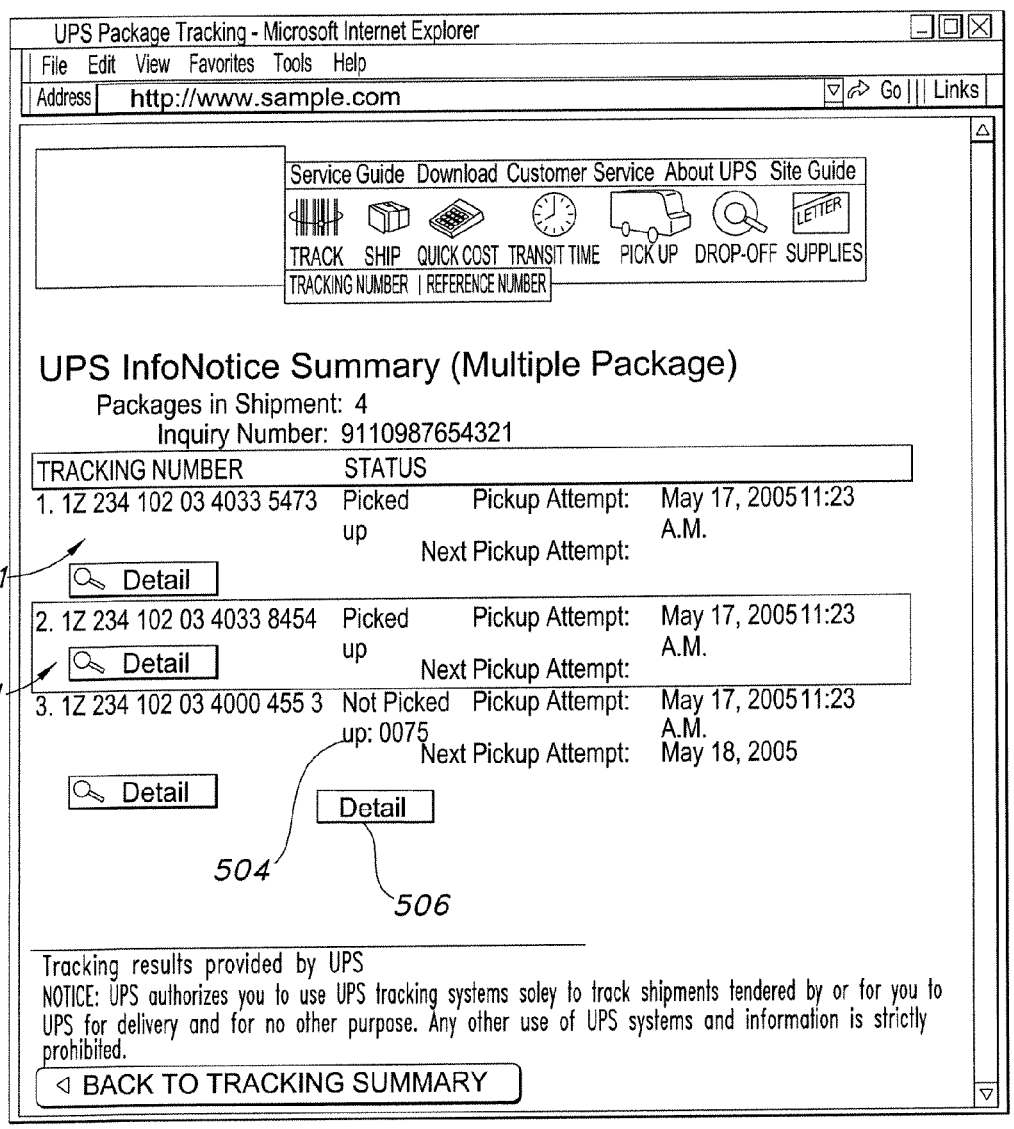
Figure 8:
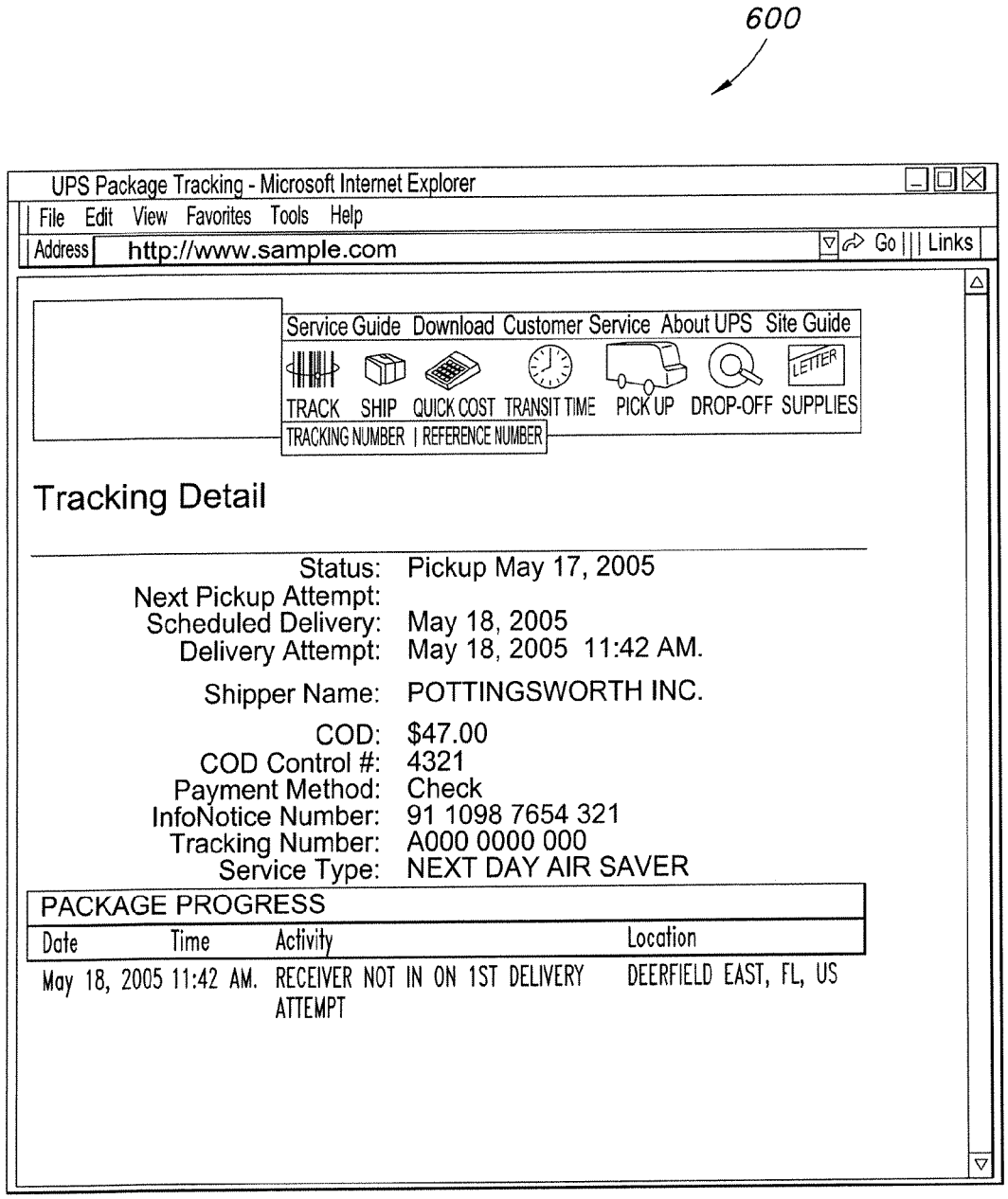
Figure 9:
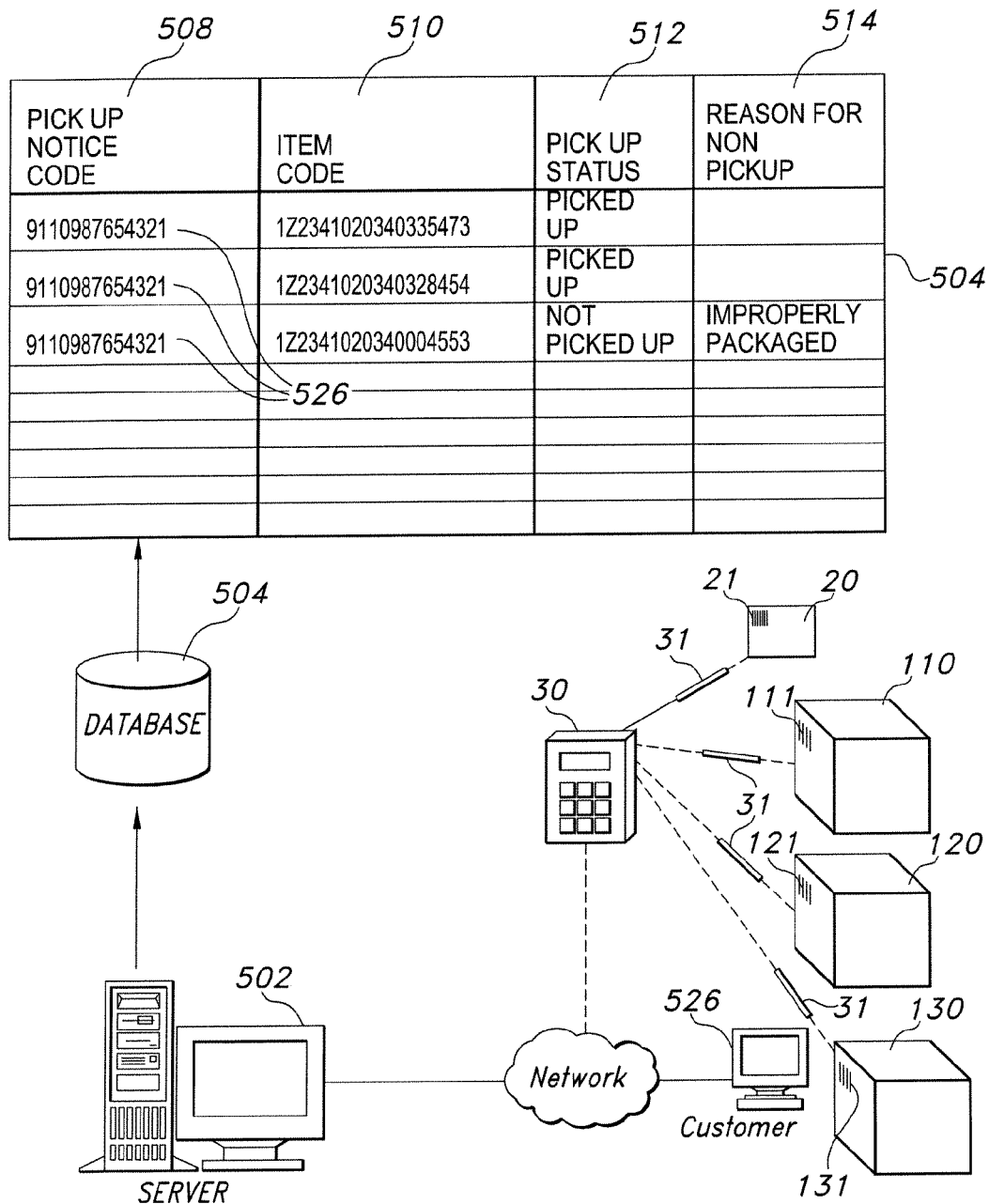
Figure 11:
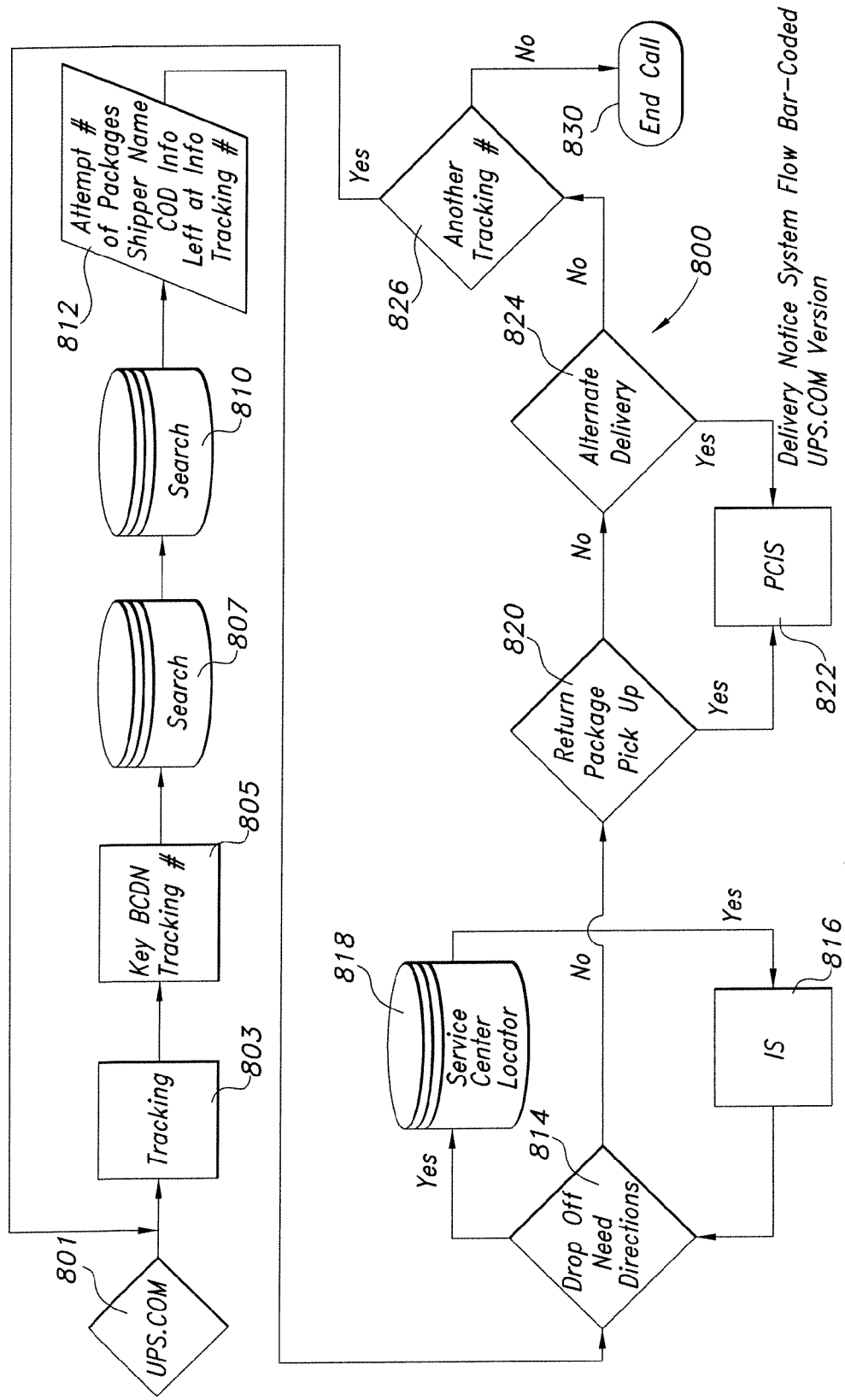
Figure 12:
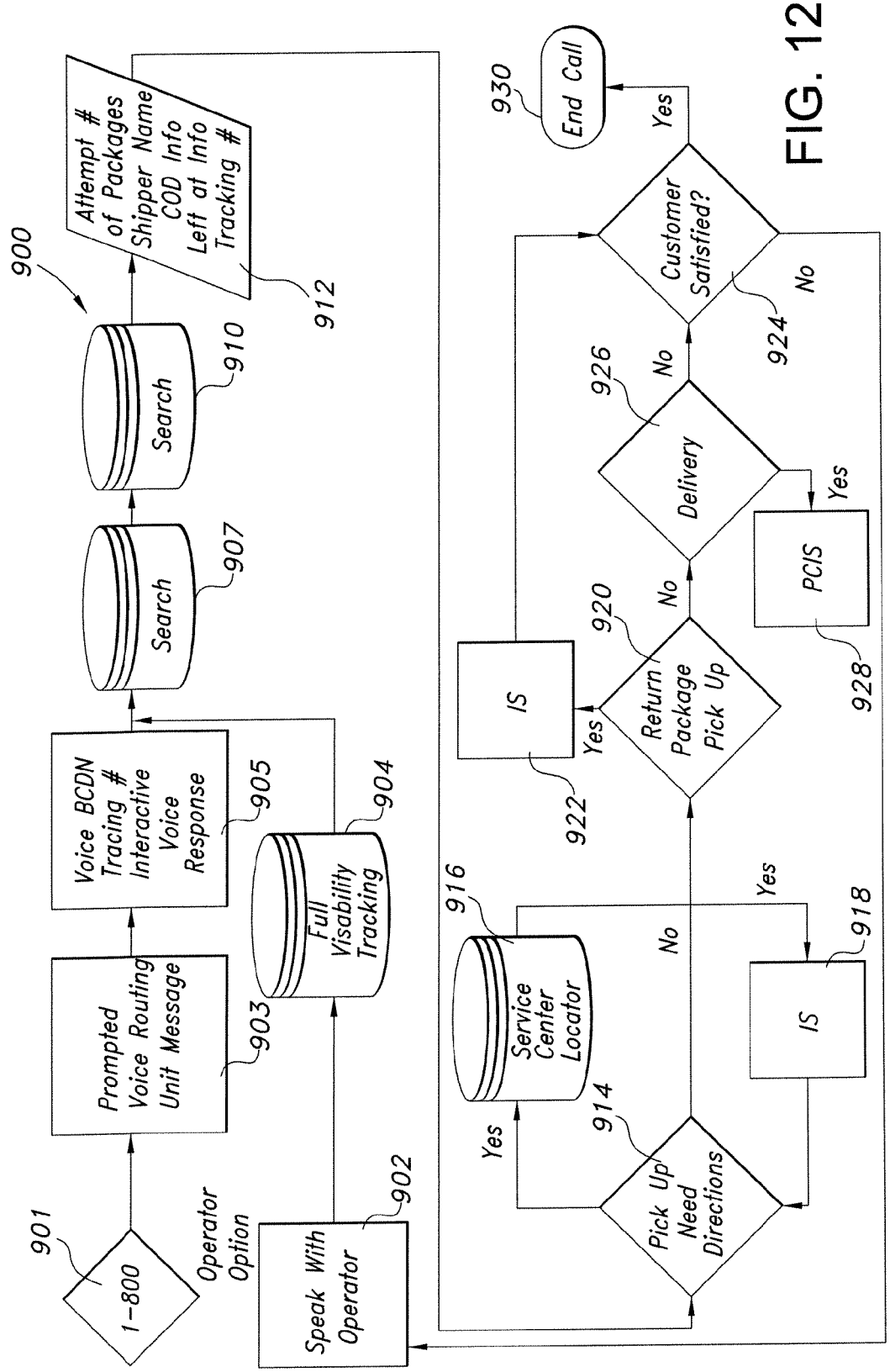

FIGS. 4A and 4B combine to show one example of the type of delivery notices contemplated under the present invention, the illustrated being a coded (e.g. bar coded) pick up notice;

FIG. 5 is an illustrative view of a delivery agent arriving at a pick up location to pick up a plurality of parcels, which in this instance, the location is the shipping area of a typical business, XYZ Corporation, having an address of 123 Elm Street;

FIG. 6 is a typical exemplary web page which the shipper would see after entering the pick up notice code which the shipper reads from the pick up notice;

FIG. 7 is a typical exemplary web page, entitled "UPS InfoNotice Summary (Multiple Package)," which shows more details of the three parcels shown related to a certain pick up notice code number;

FIG. 8 is an exemplary web page, which provides details relating to a certain particular parcel that may be helpful to a customer;

FIG. 9 is an illustration of an exemplary system and database for establishing and linking a pick up notice code with a package's database record having information about whether the package was picked up and if not picked up, an explanation for the non pick up;

FIGS. 10A-10D illustrate exemplary web pages of a delivery service's site such as, for example, myups.com, that may be encountered by a shipper or customer when attempting to redirect one or more parcels that have been picked up by the delivery service, using a pick up notice code to access the website;

FIG. 11 illustrates a process under an embodiment of the present invention in which a parcel tracking system is facilitated through the use of the Internet; and FIG. 12 is an exemplary flow chart of a process in an embodiment of the invention where the pick up notice is used by the customer in order to access a toll free number such as a "1-800" number.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The general concept of the embodiments of the present invention is for an agent of a parcel delivery service to link a unique indicator (e.g., indicia) found on a pick-up notice with location information about the pick-up stop and with unique indicia associated with the certain packages to be picked up, if any. An agent of the delivery service may use an electronic hand-held data acquisition and display device such as, for example, a DIAD™ as used by UPS, though other electronic devices such as a personal digital assistant ("PDA") type device, or some other type of portable electronic device. Usually this is a hand-held device that is carried by the service provider's agent. Captured information may be transmitted from the hand-held device to another computer at the time of capture (e.g., wirelessly), it may be transmitted to another computer once the hand-held device is placed into a cradle within a service provider's vehicle, or such information may be uploaded to another computer at a centralized location. Pick-up information may also be manually captured by, for example, recording information on a log sheet.

Figure 1A:
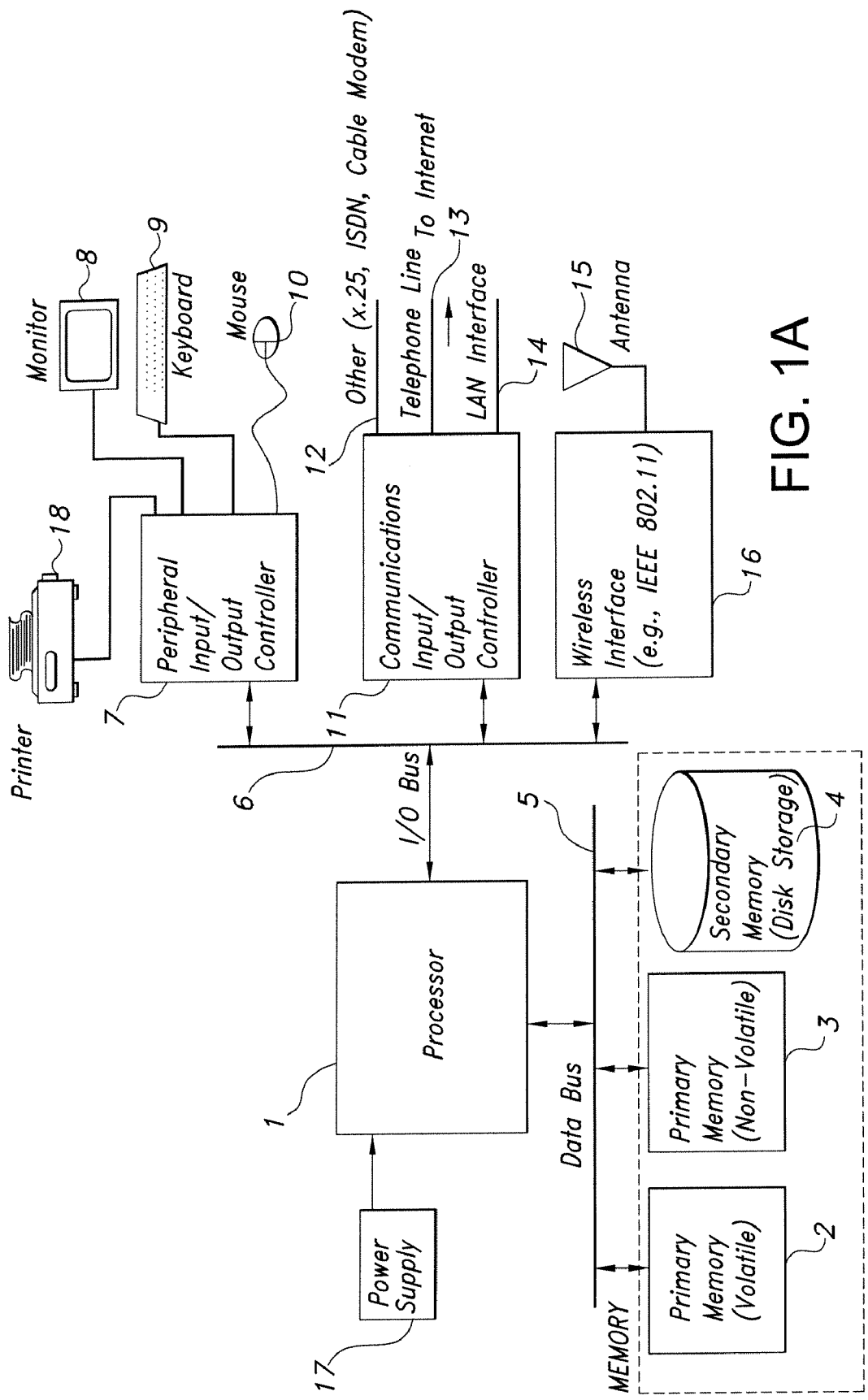
FIG. 1a is an illustration of one embodiment of a computer that can be used to practice aspects of the present invention.

In several of the embodiments of the invention referenced herein, a "computer" is referenced. The computer may be, for example, a mainframe, desktop, notebook or laptop, hand-held, hand held device such as a data acquisition and storage device, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provide power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1× EV-DO, GPRS, W-CDMA, or other protocol.

Figure 1B:
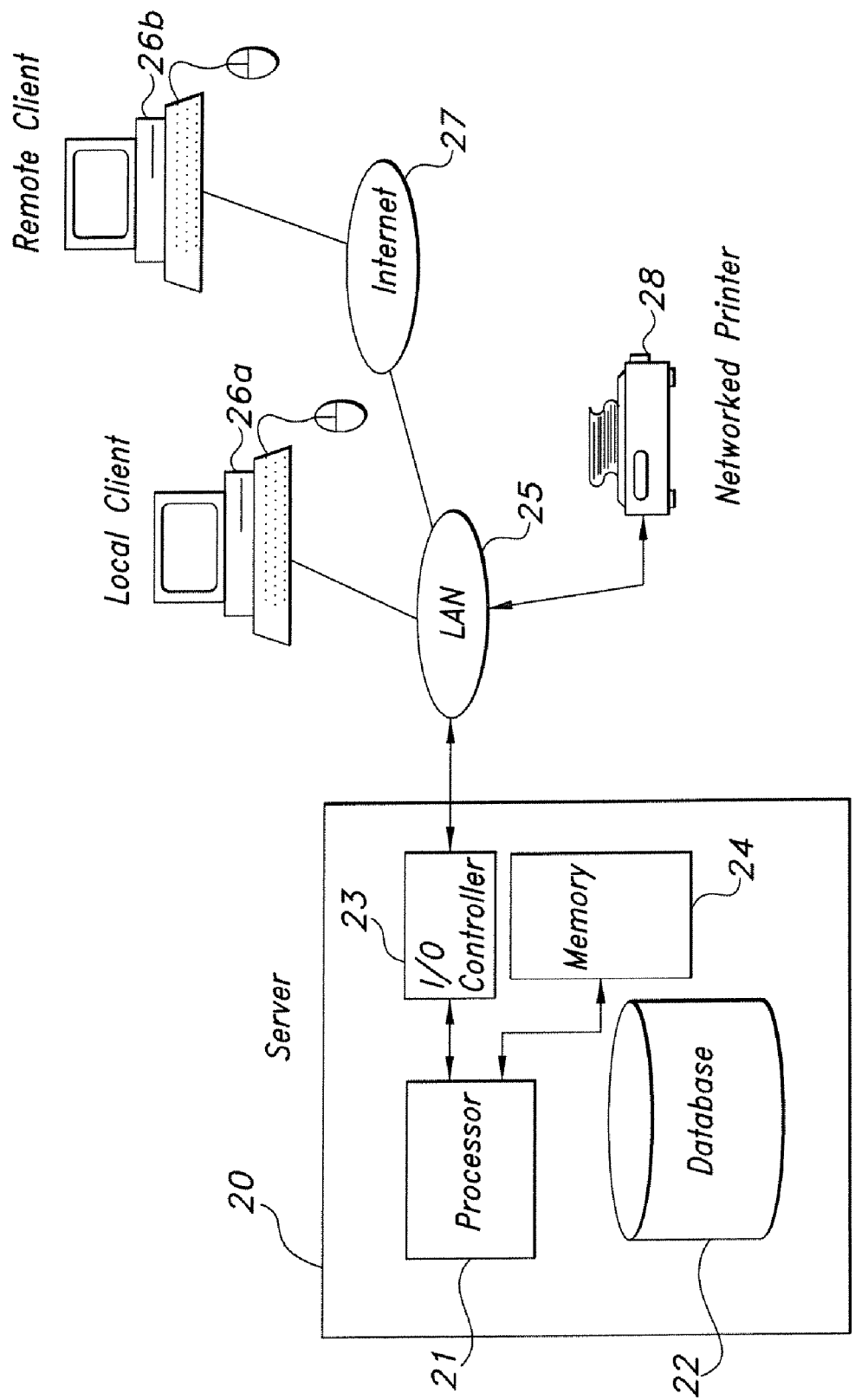
FIG. 1b is an embodiment of a processing system having a distributed communication and processing architecture that may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible such as, for example, the handheld devices contemplated herein and can be used to practice the principles of the present invention. The embodiments illustrated in FIGS. 1a and 1b can be modified in different ways and be within the scope of the present invention as claimed.

In one embodiment, the captured information may be linked by the electronic hand-held device, while in other embodiments the captured information is transferred to another computer where it is linked. Information about the location such as, for example, the address, telephone number, name of the resident or business, etc. may have been stored in the electronic data device previous to the time the pick-up stop occurred, or such information may be entered by the carrier's agent at the time of making the pick-up stop. The location information is associated with information about the pick-up delivery notice such as, for example, unique indicia found on the pick-up notice. The indicia found on the pick-up notice may be machine-readable and may be scanned by a scanner or other reading device that is associated with the electronic data device. There also may be human-readable indicia on the pick-up notice and generally, the machine-readable and the human-readable indicia are associated or linked in some manner. Furthermore, if there are items to be picked-up by the delivery service, then unique indicia on each item may be scanned or otherwise entered and linked with the indicia of the pick-up notice as well as the location.

Figure 2:
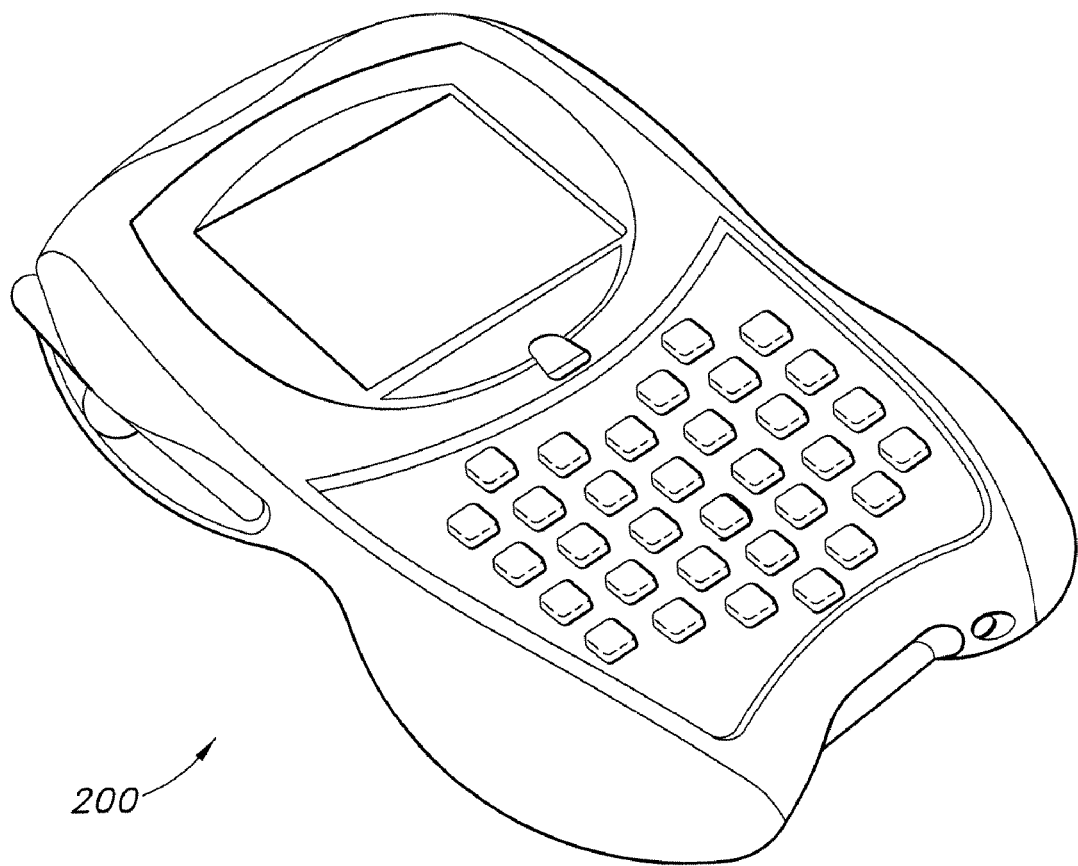
FIG. 2 is an illustration of an exemplary DIAD/DCS device that may be used to practice one or more embodiments of this invention.

Information about the delivery notice, the packages and the location, whether human-readable or machine-readable, is generally captured by an electronic hand-held data acquisition device such as, for example, a Delivery Information Acquisition Device/DIAD Control System ("DIAD/DCS") system as employed by UPS, a personal digital assistant ("PDA") type device, or some other type of portable electronic device. An exemplary DIAD/DCS device 200 that may be used to practice this invention is shown in FIG. 2. U.S. patent application Ser. No.: 10/227,147; filed Aug. 23, 2002, *Portable Data Acquisition and Management System and Associated Device and Method*, and published as Publication No. US-2003-0114206-A1 on Jun. 19, 2003, fully incorporated herein by reference, and made a part hereof, describes a similar DIAD/DCS device as that shown in FIG. 2.

Usually the data acquisition device is a hand-held device that is carried by the delivery service's agent. Captured information may be transmitted from the hand-held device to another computer at the time of capture (e.g., wirelessly), it may be transmitted to another computer once the hand-held device is placed into a cradle within a service provider's vehicle, or such information may be uploaded to another computer at a centralized location. Information may also be manually captured by, for example, having a recipient manually sign next to a package's tracking identifier on a log sheet, or for the delivery agent to manually write or enter information.

The embodiments of the present invention provide for the delivery agent of the delivery service provider (i.e., "carrier") to capture an identifier from the pick-up notice and at least one second identifier at the time of pick-up of one or more parcels at a particular pick-up location. Generally, packages that are made available for pick-up will have a mailing label attached that will have an identifier. The identifier may be in machine-readable form, human-readable form or both, machine-readable and human-readable forms. In other instances, the carrier's agent may have to attach or associate an identifier with one or more of the items to be picked up if one does not exist. Each identifier is unique in some manner from the identifiers used on other items, though an identifier may be "recycled" and re-used at a later date. For instance, an identifier in one embodiment may be a barcode that is unique from the barcodes on all other items at that time. However, later in time, once an item having a barcode has been processed and is cleared from the delivery service's systems, the same barcode may be used on another item. In other instances the identifier may be a radio-frequency identification (RFID) transponder (i.e., RFID tag), as are known in the art.

As provided above, this identifier is associated with an item that is to be picked-up by the delivery service (an "item identifier"). The identifier, as well as the identifier on the pick-up notice, may be unique human-readable indicia, machine-readable indicia, or a combination of both, human-readable and machine-readable indicia. The pick-up notice identifier is generally in the form of one or more barcodes located on the pick-up notice, although other forms such as, for example, RFID tags, infrared devices, magnetic strips, electronic signals, optical signals, digital signatures, sounds, colors, shapes, odors, etc., may be used in various embodiments of this invention. Likewise, the item identifier may be a barcode that is found on the shipping label of each item to be picked up by the delivery service or may be separately associated with the items. As above, other forms of item identifiers such as, for example, RFID tags, infrared devices, magnetic strips, electronic signals, optical signals, digital signatures, sounds, colors, shapes, odors, etc., may be used in various embodiments of this invention for either of the identifiers (e.g., pick-up notice identifier and item identifier).

While making a pick-up at a particular pick-up location, the service provider's agent will obtain information about the pick-up notice identifier and information about the item identifier of each package that is to be picked up at that location. Generally, obtaining the pick-up notice identifier information is accomplished by scanning a unique barcode on a pick-up notice from a plurality of pick-up notices, where the particular pick-up notice is to be left at the pick-up location and the package identifier information is obtained by scanning a unique barcode on each package scheduled for pick-up at that location, though other methods of scanning and/or reading machine-readable or human-readable indicia are contemplated for the embodiments of this invention. As provided above, if each item or package does not have an identifier, one may be attached or associated with the item by the agent. The pick-up notice barcode (i.e., pick-up notice identifier) is then linked to the barcode of each package (item identifier) that is to be picked up at that pick-up location. The linking occurs electronically either in the hand-held device or after the information is transferred to another computer. The "linking" aspect and embodiments of the systems and methods of this invention are more fully described in U.S. Pat. No. 6,634,551; *"Delivery Notice And Method Of Using Same"*; filed Mar. 23, 2001 and issued on Oct. 21, 2003 and U.S. patent application Ser. No. 10/689,514; *Systems and Methods of Item Delivery Utilizing A Delivery Notice*; filed Oct. 20, 2003; both fully incorporated herein and made a part hereof.

In one embodiment, each pick-up notice has one or more unique barcodes, each unique barcode on a pick-up notice is associated with that specific pick-up notice. Each item identifier (e.g., barcode) is associated with at least ship to and ship from addresses. In some instances the pick-up notice identifier and the item identifiers are associated with the physical address of a pick-up location, which may not necessarily be the "ship from" address. This may be accomplished, for example, by storing cross-references of the pick up notice indicia with corresponding address information of the pick-up location in an electronic database or an electronic table as is known in the art. The pick up notice indicia may be linked with a pickup location by, for example, scanning the pick up notice indicia with the handheld device previously described and carried by the carrier's agent, and then entering or selecting the address of the pick-up location into the handheld device. Therefore, when a pick-up notice barcode is linked with an item's barcode, the pick-up notice indicia (human readable and machine readable) may be used to access the electronic database or table and indicate the pick-up location (i.e., address), delivery location, ship from information, receipt by the consignee, etc. Linking the package or item indicia with the pick-up notice indicia also provides proof that the delivery service's agent picked up the items that were made available for shipment. This proof of pick-up may be electronically stored and made available to vendors (e.g., shippers), and those who ordered the products, and/or consignees. For example, a shipper that has a pick-up notice may access a carrier's tracking system over a network (e.g., the Internet), enter the human-readable pick-up notice indicia, and determine the time and date of the package pick-up, as well as the tracking numbers assigned to the packages picked up (if not previously known to the shipper).

Because the embodiments of the present invention provide indication of the actual pick-up of shipped items by a delivery service, the status of the items (from the tracking system of the delivery service) and information about the delivery of the items (also from the carrier's tracking system); the information provided by the embodiments of the present invention may be used to track items during shipment, to allocate inventory to its actual delivery location (where it is received), and to release funds for the payment of the shipped product. Furthermore, such information may be used to create operational and managerial reports for the consignee as well as the vendors and shippers. Such reports may be electronically distributed to the parties. An exemplary package tracking or visibility system that may be used in one or more embodiments of the present invention is described in U.S. patent application Ser. No. 10/265,079; "Inbound and Outbound Shipment Notification Methods and Systems," filed Oct. 4, 2002, publication number US2003-0097287-A1, published on May 22, 2003, hereby fully incorporated herein and made a part hereof.

Previously incorporated U.S. Pat. No. 6,634,551 ("the InfoNotice patent") issued on Oct. 21, 2003 and assigned to the United Parcel Service of America, Inc. (UPS) describes a system and method of linking a delivery notice with one or more items. In the InfoNotice patent, a delivery notice is linked to one or more items when delivery of the items at a delivery location is not available. The delivery notice is left at the delivery location. The intended recipient may then use indicia on the delivery notice to obtain and/or modify information about the items that were to be delivered. Similar to the InfoNotice patent, in the embodiments of the present invention a pick-up notice is linked with a pick-up location and/or with any items to be picked up at that location. The pick-up notice is left at the pick-up location by the carrier's agent and the shipper(s) may obtain information about the items picked up or those not picked up from the delivery service by use of the pick-up notice. Information about the pick-up or attempted pick-up, the stop and other package tracking information can be obtained and/or modified by using indicia (human readable and/or machine readable) associated with the pick-up notice.

General Discussion

Generally described, under one aspect of the invention, a single unique pick up notice is left at the particular location where one or more parcels are picked up, or attempted to be picked up by a delivery service (i.e., carrier). However, just before the pick up notice is left, this notice is electronically "linked" to the parcel(s) found or provided at the pick-up location. This can be done by a handheld portable data acquisition device which includes a conventional scanning or reading means, allowing information to be scanned or read from the delivery notice as well as labels on the parcels, and stored on the handheld portable data acquisition device. If ten parcels were picked up, only one pick up notice is left behind, but the pick up notice is electronically "linked" to all ten packages. Furthermore, the pick up notice is linked to parcels that were available for pick up, but that were refused by the delivery service for some reason.

The shipper (or other interested party having access to the pick up notice) can then contact the delivery service via the Internet (or other suitable network) or by phone, by using information provided on the pick up notice. By providing the delivery service with unique information from the pick up notice, the shipper can get information regarding the shipped parcels. Such information can include, for each package picked up, intended recipient's name and address, ship from address, shipper or vendor's name, anticipated date of delivery, COD status, etc., and for the shipping location (as a whole), the number of packages that were picked up at a shipping location, the address of the shipping location, etc. Arrangements may also be made to have one or more of the picked up package(s) redirected, held at a local operation center, returned to the shipper, etc., and arrangements can be made for the packages that were not picked up to be picked up at a future date or time, to be picked up at a different location, to be delivered by the shipper (or their agent) to a delivery service center, to cancel pick up, etc.

The Overall System

Figure 3:
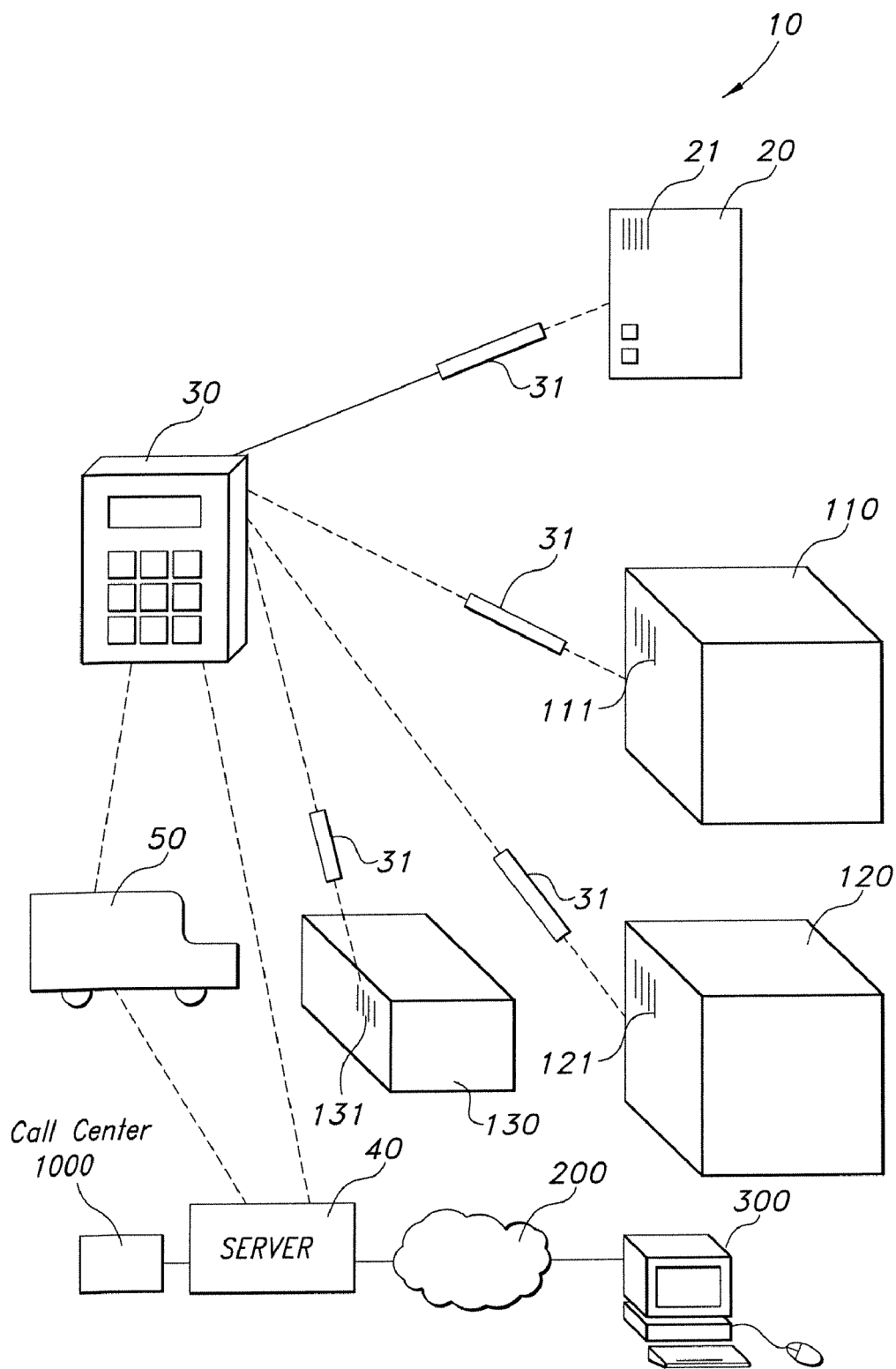
FIG. 3 is an illustrative view of the various data connections between various elements of the overall system 10 according to one embodiment of the present invention.

Reference is now first made to FIG. 3, which is an illustrative view of the various data connections between various elements of the overall system 10 according to one embodiment of the present invention. The system 10 includes a pick up notice 20, having a pick up notice code 21 thereon, a data acquisition device 30 having a scanning or reading element 31, and a server 40. As discussed in further detail herein, in an alternate embodiment the system can also include a parcel delivery car 50. Also as discussed in detail later, the system can also include an internet 200 connection or other suitable network connection to provide access by customers (a.k.a. "users") to typical computers 300, or can include the use of a call center 1000.

The Pick Up Notice

Reference is now made to FIGS. 4A and 4B, which combine to show one example of the type of delivery notices contemplated under the present invention, being a coded (e.g. bar coded) pick up notice 20. The notice in one embodiment is a piece of paper printed on both sides. The first side includes a machine-readable "first" pick up notice code 21 ("InfoNotice Code"), which corresponds to a human-readable "second" pick up notice code 22 ("InfoNotice Number"), which is in this case numerals, although it could be alphanumeric, symbols or any human readable format (in the embodiment shown the number is 9110987654321). Also included on the notice 20 is various other self-explanatory text on the notice in areas 23, 24, 25, 26, 27, and 29, with particular attention directed towards the text within area 26, which provides a telephone number to allow a person to call a telephone number to access tracking information at the web site shown. Another particular area of interest is the text at area 28, which indicates whether the notice 20 was left because of a failed delivery attempt, or because of a pick up or attempted pick up of one or more parcels. The particular notice 20 may be used for both, deliveries and pick ups, though it is to be appreciated that in other embodiments there may be separate notices for deliveries and separate notices for pick ups.

In one embodiment the codes 21 and 22 are the same code or at least include common code portions, although the use of different although associated codes is also contemplated under the spirit and scope of the present invention. However, it should be noted that such human-readable and the machine-readable codes do not have to be the same codes, although they do need to be associated or "linked" in order to provide the needed link between the code read by the customer and the notice code scanned by the delivery agent 100. As an example, the two codes could be different but linked together back at, for example, a central server.

Under one version, a yellow notice 20 is used. It may be understood that the same or other colors could be used under the current invention.

The Packages

As shown in FIG. 3, the exemplary package 110 includes a machine-readable package code 111 (a.k.a. "item code"), which in one embodiment is a "tracking number" or "1Z" number as referenced by United Parcel Service, although obviously other package codes used to track or identify packages may also be used. The same is true for exemplary package 120 which includes a similar machine-readable package code 121, and exemplary package 130, which includes machine readable package code 131. In these cases the embodiment of the machine-readable package code is in the form of visible indicia, although other non-visible means such as radio frequency, magnetic media, sound, texture, or the like may also be used without departing from the spirit and scope of the invention. In these cases the embodiment of the indicia is a bar code, although other codes are contemplated without departing from the spirit and scope of the invention such as, for example, an RFID tag. If a package is left for pick up and does not include an item code, then the agent of the delivery service may affix or associate such an item code with the package. The item code may be incorporated into a shipping label, as are known in the art. Item codes are unique among other item codes and among pick up notice codes.

The machine-readable package codes 111, 121, and 131 of the embodiment shown in FIG. 3 are configured to be read by a code reader such as a bar code scanner, although an RFID reader as are known in the art, or other code readers and/or scanners are contemplated without departing from the spirit and scope of the invention.

Data Acquisition Device

Continuing to refer to FIG. 3, the system 10 according to the present invention also includes a data acquisition device 30 having a scanning or reading element 31 (e.g., a bar code reader, an RFID reader, etc.) configured to scan the bar codes 21, 111, 121, and 131 discussed above, or to read other machine-readable indicia such as, for example, RFID tags.

The data acquisition device 30 may be such as known under the mark "DIAD/DCS," as described in more detail above, equipped with a suitable scanner or reader 31 and loaded with the appropriate hardware and software suitable to perform the scanning and data storage features noted below, one example of which is shown in FIG. 2. Briefly stated, such scanning capabilities include the capabilities to scan or read machine-readable codes such as bar codes and RFID tags. The associated software and hardware include the capabilities of converting the readings from the scanner to appropriate digital data for storage within the data acquisition device 30. The data acquisition device 30 should also include appropriate hardware and software to allow such digital data to be transferred from the data acquisition device 30 to an external storage means such as a centralized computer server 40 such as known in the art. In one embodiment data may be transferred at least partially wirelessly from the data acquisition device 30 to the centralized computer server 40. Furthermore, in one embodiment, the data acquisition device 30 includes appropriate hardware and software to allow the linking of electronic data associated with a notice code 21 with one or more item codes 111, 121, and 131.

Server

Such a server 40, as noted above, can receive data from the data acquisition device 30 through a direct route such as shown in dotted line, or through an indirect route, also as shown in dotted line through hardware associated with the driver's package car 50. It should be understood that the type of connecting hardware or software is not essential to the present invention; many different types of data acquisition devices and transfer means may suffice.

Information on the server 40 is used to provide information for the shipper, intended package recipients, or other interested parties possessing proper access information through use of the Internet 200 (or other suitable network) or alternately by use of telephone call centers such as 1000. As discussed in later detail, the shipper, intended package recipients, or other interested parties provide the human-readable pick up notice code 22 over the Internet or the telephone and receive information back about the shipped parcel(s).

The Delivery Agent

Reference is now made to FIG. 5, which is an illustrative view of a delivery agent 100 arriving at a pick up location to pick up a plurality of parcels 110, 120, 130, which in this instance is the shipping area of a typical business, XYZ Corporation having an address of 123 Elm Street. In the view shown, the agent has scanned or read a pick up notice 20 by use of a data acquisition device 30, and has left the notice 20 at the address 123 Elm Street. Unless there is a violation of certain business rules of the carrier, the agent will in this instance not leave the parcels 110, 120 at the address, but will retain them for a delivery attempt to the intended recipient. However, parcel 130 is left behind as it fails to comply with one or more of the business rules of the delivery service. This will now be discussed in more detail in conjunction with an example.

EXAMPLE

It will first be assumed that a computer system from XYZ Corporation is to be picked up in the form of three boxes, by a delivery agent 100 (working for a company such as, for example, United Parcel Service or America, Inc. ("UPS")) such is shown generally in FIG. 5, at a pick up location of 123 Elm Street. It will be assumed that three parcels 110, 120, 130 are to be shipped and delivered, with each parcel including a different machine-readable parcel code (a.k.a. "item code") readable therefrom.

It will also be understood that delivery agent will be equipped with at least a data acquisition device 30 and a pick up notice 20. Typically the delivery agent will carry a pad containing a plurality of pick up notices.

The coded (e.g. bar coded) pick up notice 20 shown in FIGS. 4A and 4B is one example of the type of pick up notices contemplated under the present invention. The pick up notice includes, but it not limited to, a machine-readable pick up' notice code 21, a human-readable pick up notice code 22 (in the embodiment shown the number is 9110987654321. In one preferred embodiment the codes 21 and 22 are the same code or at least include common code portions, although the use of different although associated codes is also contemplated under the spirit and scope of the present invention. As an example, the two codes could be different but linked together back at, for example, the central server.

Approach to Delivery Location

As noted, the pick up location is XYZ Corporation at 123 Elm Street. The delivery agent 100 (a.k.a. "driver") such as shown in FIG. 5 will arrive at the 123 Elm Street address. The driver will proceed to an area where items for pick up have been placed. The driver will then access or "pull up" the address on the data acquisition device 30. If the address is not already stored in the data acquisition device, the driver will then enter it. The driver indicates that the stop is a pick up stop (as compared to a delivery stop) or that the packages to be scanned are scanned for pick up. This may be done on a package by package basis. The driver then scans with the scanner 31 the codes 111, 121, 131 on each package 110, 120, 130, respectively. The driver will then press "Enter" on the data acquisition device 30 or otherwise indicate that this is all the packages that are to be picked up at this location. This may be understood as the machine scanning of a machine-readable "item code" or "parcel code" from each package. If one or more of the parcels to be picked up do not have an item code or if the item code is damaged or otherwise illegible, then the driver may affix an item code to the parcel(s) and the affixed item code is linked to the information about the parcel and the pick-up location.

The data acquisition device 30 will then prompt the driver to scan a bar-coded pick up notice such as shown as 20 in FIGS. 3, 4A, 4B and 5. The delivery agent 100 will then pull such a pick up notice 20 out of his or her pocket or other suitable storage location, and then will scan the machine-readable pick up notice code portion 21 on the notice 20 with the scanner 31 included with the data acquisition device 30. The pick up notice code 21 is then linked with the codes 111, 121, 131 on all the packages. The driver will then attempt pick up of each parcel to begin its delivery parcel if each parcel complies with the carrier's business rules.

Pick Up Possible

Pick up of all the parcels 110, 120, 130 is possible if each of the parcels and their shipping labels meet the business rules of the delivery service. For instance, if the parcels are properly packaged and if the shipping label correctly identifies the intended recipient and an address with sufficient information to allow the delivery of the parcel as well as payment or arrangements for payment to the delivery service, then the packages 110, 120, 130 will be picked up by agent 100 of the delivery service and the pick up notice 20, which has been linked to the picked up parcels, will be left at the delivery location by the delivery service's agent 100. For each item code 111, 121, 131 scanned by the driver, suitable entry is made in the data acquisition device 30 that the parcels have been picked up. For instance, the driver 100 will indicate whether the parcel complies with the delivery service's business rules and whether the parcel is picked up by the driver by entering information into the data acquisition device 30 by pressing a button, typing in data, scanning a bar code, reading an RFID tag, or some other manner.

No Pick Up Possible of One or More Parcels at a Pick Up Location

If one or more of the parcels 110, 120, 130 to be shipped do not meet the certain predetermined business rules, then the driver 100 will not retrieve such a parcel 130 and will leave such packages at the pick up location. The driver 100 indicates for each parcel having its item code scanned, whether the parcel is picked up for delivery by the delivery service, by the driver entering into the data acquisition 30 device the pick up status (picked up, or not picked up). If not picked up, the driver 100 may be prompted by the data acquisition device 30 for additional information, including a reason for not picking up the parcel 130. Such information may be entered via a code or be scanned into the data entry device 30 from a list of barcodes, RFID tags, etc. The driver 100 may, in some instances, write on the pick up notice 20 information about the parcels left behind, including a reason for non-pick up and corrective measures that should be undertaken.

Generally, reasons for not picking up a package 130 include the absence of a SRB (standard register book) or manifest to sign for to account for packages, improper packaging, prohibited items (e.g., hazardous materials, etc.), size and/or weight limit exceptions, or other domestic issues. International shipments may not be picked up because of missing account number or payment (credit card number or check), incomplete multiple, incomplete waybills, missing documentation (E.G., invoice, value declaration, country of origin, description of goods, etc.), or other international issues Unless such information is already entered, the driver 100 can also fill out preliminary information such as the date, COD status, other needed information, etc. for each package picked up and will then press "stop complete" on the data acquisition device 30 or otherwise indicate that data collection is complete. This completes the creation of a pick up stop record, which under one embodiment of the present invention, may include but is not limited to the following data fields: pick up location, ship from address, package delivery address, item code, pick up notice code(s), time and date, COD information, etc.

At this point the there has been a link between the machine readable (e.g., bar coded) delivery notice code 21 and the machine-readable (e.g., bar coded) tracking numbers 111, 121, 131 on each of the packages 110, 120, 130. The pick up notice 20 is left at the pick up location and the packages (that meet the business rules of the delivery service) 110, 120 then go into the delivery agent's vehicle to begin the delivery process.

When the shipper or their agent comes home or otherwise visits the pick-up location, he or she retrieves the pick-up notice 20 left at the site by the delivery service's agent 100 and he or she has the option of using at least two modes of communication with the delivery service (e.g. UPS); through a 1-800 line, or through the Internet at, for example, UPS.COM, MYUPS.COM, or another suitable location.

The Internet Connection

Under this mode of communication, the customer goes to UPS.COM, MYUPS.COM (or any other suitable Internet or network location) and clicks (via a "mouse" or some other suitable interface device) on a "pick up notice" or other suitable icon or location. Such clicking would direct the customer to a web page that will prompt for and allow entry of the human-readable indicia 22 associated with the bar-coded delivery notice number 21.

By virtue of the above-referenced "link" between the pick up notice and the package information (which can be done through suitable database manipulation and control as known in the art) the customer can then be told by the delivery service that the shipper has two packages that were picked up on a certain date and time, that one package was left behind, the status of the shipment (delivered, undelivered, etc.), and tracking information, or whether on or more of the parcels were not picked up and the reason they were left behind. Other relevant information can also be provided, such as information noting that a COD request is made, how and to whom payment should be made, etc.

If desired, the individual parcel(s) that were picked up can be tracked through current means associated with a tracking number. The tracking number for each parcel can be obtained from the website using the pick up notice.

At that time, the shipper could then click on an icon allowing the shipper to be linked to suitable locations which would allow the shipper to have the delivery service leave the parcel at a local delivery center, the shipper could stop delivery of the parcel, the shipper could request future or delayed delivery, or the shipper could initiate a "delivery change" request, in which the shipper could key in a new address. Such a new address could be automatically checked for validity by the delivery agent software by suitable means, and if the address is valid the parcel(s) could be sent to the new address.

For parcels that were not picked up at the pick up location, the shipper can request pick up at an alternate location, pick up on a different date and/or time, cancel pick up, notify the delivery service that the parcel will be delivered to a delivery service's shipping location and that pick up is no longer necessary, etc.

Reference is now made to exemplary web pages which may be used to facilitate such interaction between the shipper and the delivery service. FIG. 6 shows a typical exemplary web page which the shipper would see after entering the pick up notice code 22 which the shipper reads from the pick up notice 20, which in this case is 9110987654321. The page, which could be referenced as the "Tracking Summary" page, shows that the pick up occurred on May 17, 2005, at 11:23 A.M., and that (in this example) there were three packages scanned at that pick up location and two of the packages were picked up by the driver.

FIG. 7 shows a typical exemplary web page, entitled "UPS InfoNotice Summary (Multiple Package)," which shows more details of the three parcels shown related to the pick up notice code number 9110987654321. As may be seen, such details include the package tracking number (a.k.a. the "item code") for the individual packages, with the three exemplary parcel tracking numbers 111, 121, 131 from FIG. 3 being denoted being shown as the first three packages in this list. As may also be seen, other package-related data is shown which is of informational value, such as when the pick up was made, how many packages were in the pick up, whether any packages were refused by the delivery service and a reason for refusal, delivery address, whether a delivery attempt has been made and/or how many delivery attempts have been made, etc. Some of this information may be viewed by clicking on the "Detail" button 502 associated with this page.

For example, the first package listed has a package tracking number 111 of 1Z2341020340335473, the notice is associated with its pick up time and location, the intended delivery location (via the "Detail" button 502), that a first pick up attempt was made on May 17, 2005 at 11:23 AM, and a next delivery attempt will not be required as pick up was successful.

The second package listed has a package tracking number 121 of 1Z2341020340328454, the notice is associated with its pick up time and location, the intended delivery location (via the "Detail" button 502), that it has a status of undelivered, and that a first delivery attempt has not been made. In one embodiment, additional detail about delivery or attempted delivery of a package may be accessible by obtaining any information about a delivery notice (as described in U.S. Pat. No. 6,634,661 and U.S. patent application Ser. No. 10/689,514, both previously incorporated herein) and displaying it to a user. Such information may include the number of attempted deliveries, reason(s) for non-delivery, whether a package was refused, etc.

The third package listed has a package tracking number of 1Z12341020340004553, the notice is associated with a pick up code 504 indicating that the package was not picked up because the shipping container was improperly sealed. If the pick up code's 504 description is not visible on this page, in one embodiment it may be accessed via a "Pick Up Detail" 506 button. The first pick up attempt was May 17, 2005 at 11:23 AM, and its next pick up attempt will be at May 18, 2005.

As noted above, the third package was not picked up during the first pick up attempt and a second pick up attempt is scheduled for the next day. It may be understood that it may also be possible that this package may have another earlier-in-time pick up notice associated with it corresponding to an earlier pick up attempt. If the customer uses the earlier-in-time pick up notice, then the same, most current, parcel information will be shown to the customer.

Note that if further detail is required, the customer can use or "click" on the hyperlink 502, to access a web page such as shown in FIG. 8.

FIG. 8 is a web page 600 which shows many details relating to a certain particular parcel. As may be understood, such information can be helpful to a customer. As may be seen, this page, entitled "Tracking Detail", shows the status as "Picked Up" on May 17, 2005, and a first delivery attempt scheduled for May 18, 2005, etc. Also, this web page 600 shows that the first delivery attempt was made on May 18, 2005 at 11:42 a.m., but that a receiver was not in on the first attempt. This delivery attempt information may be available by having the package (or packages) also linked to a "Delivery Notice" as such is described in U.S. Pat. No. 6,634,551, previously incorporated herein.

FIG. 9 is an illustration of an exemplary system and database for establishing and linking a pick up notice code with a package's database record having information about whether the package was picked up and if not picked up, an explanation for the non pick up. In FIG. 9, a server 502 that is controlled by or accessible to a delivery service includes a database 504. The database is comprised of one or more records 526. Information contained within the database is entered by the customer 524 and/or the delivery service. Database information may be entered, retrieved and accessed by, for example, the data acquisition device 30. In the embodiment of FIG. 9, each record 526 in the database 504 is comprised of at least four fields: the pick up notice code 508, which is in either the form of the human readable delivery authorization code 22 or the machine-readable delivery authorization code 21 from the pick up notice 20; an item code 510, which is a unique number, alphanumeric code or any other form of code that is assigned to an item by the delivery service or a shipper and may be machine read from the item(s); a status for the item (i.e., whether picked up by an agent of the delivery service or left at the pick up location) 512; and, a code or description for the reason for non-pick up (if the item was not picked up) 514.

Thus, as can be seen in FIG. 9, a customer or shipper 524 having access to the pick up notice code 508 may access the database 504 through the server 502 and obtain records 526 for each parcel picked up or scanned at a pick up location and may obtain the status 512 of each parcel scanned and can determine a reason 514 why any parcels were not picked up. The information in the database 504 of FIG. 9 may also be accessed, entered and retrieved by, for example, the data acquisition device 30 as shown in FIG. 9.

In one embodiment of the present invention, a shipper or customer having access to the pick up notice code 22 can direct shipment of the picked up parcel(s) to a new delivery location. In some embodiments, the one requesting to change the delivery address may be required to have additional authorization and/or authentication beyond merely having a pick up notice code 22, which may include prior registration with the delivery service.

FIGS. 10A-10D illustrate exemplary web pages of a delivery service's site such as, for example, myups.com, that may be encountered by a shipper or customer when attempting to redirect one or more parcels that have been picked up by the delivery service, using a pick up notice code 22 to access the website.

Figure 10A:
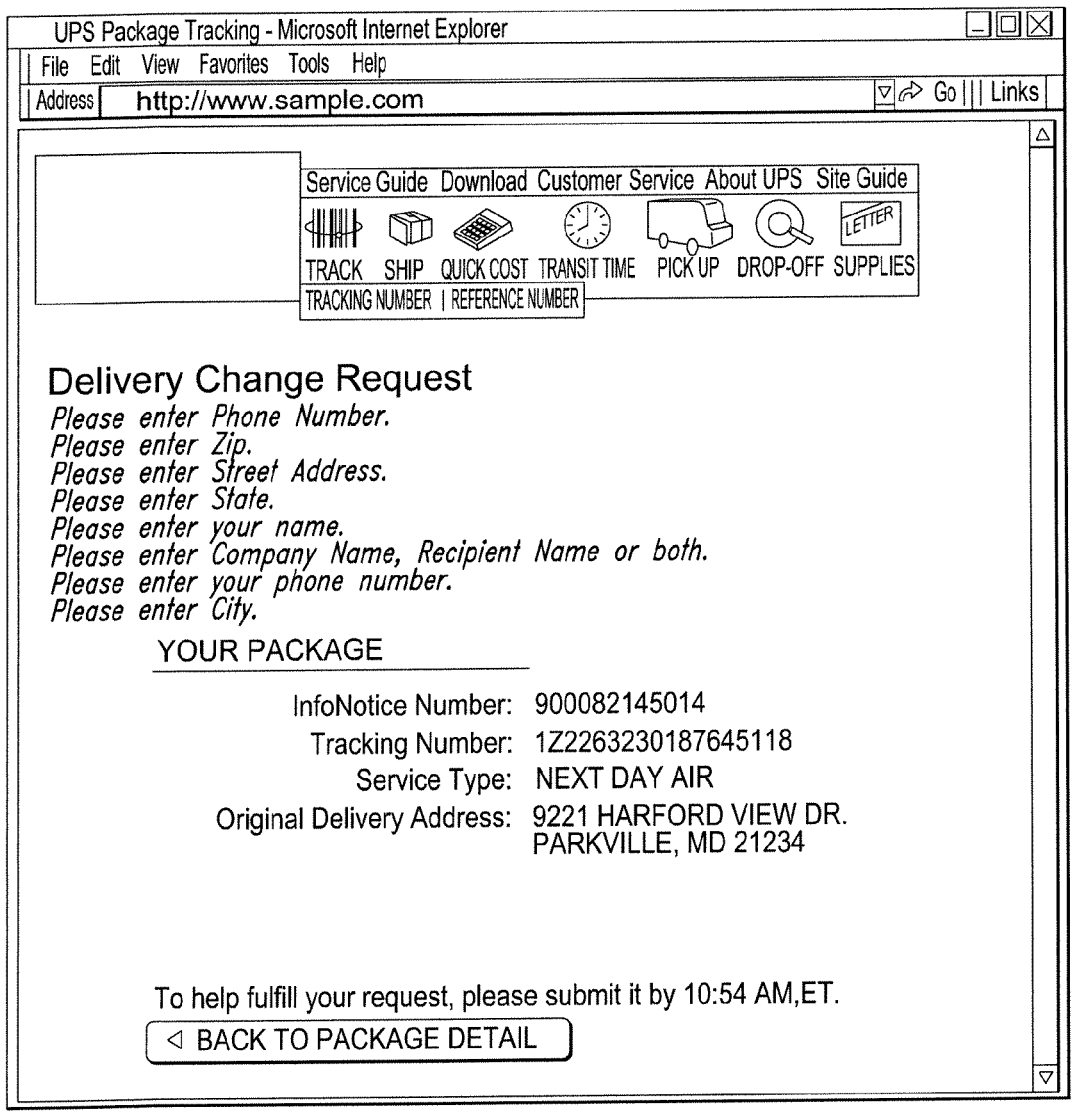

FIG. 10A illustrates an exemplary screen-shot of a web page in an embodiment of the invention that indicates the customer has not provided all of the required information when making a request through an Internet system for the package to be shipped to an alternate location.

Figure 10B:
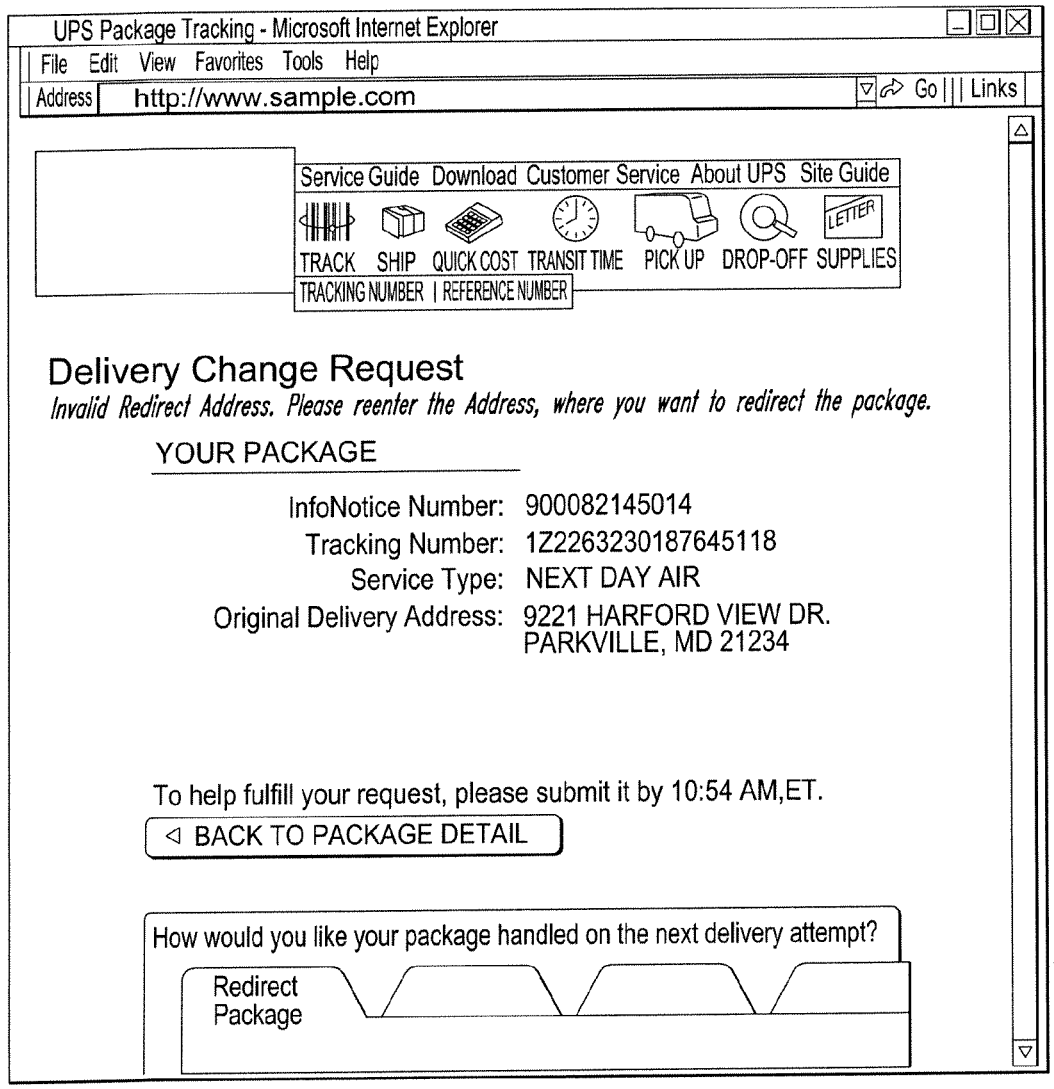

FIG. 10B illustrates an exemplary screen-shot of a web page in an embodiment of the invention that indicates that the customer has provided an invalid city, state, or zip code entry when making a request through an Internet system for the parcel to be delivered to an alternate location.

Figure 10C:
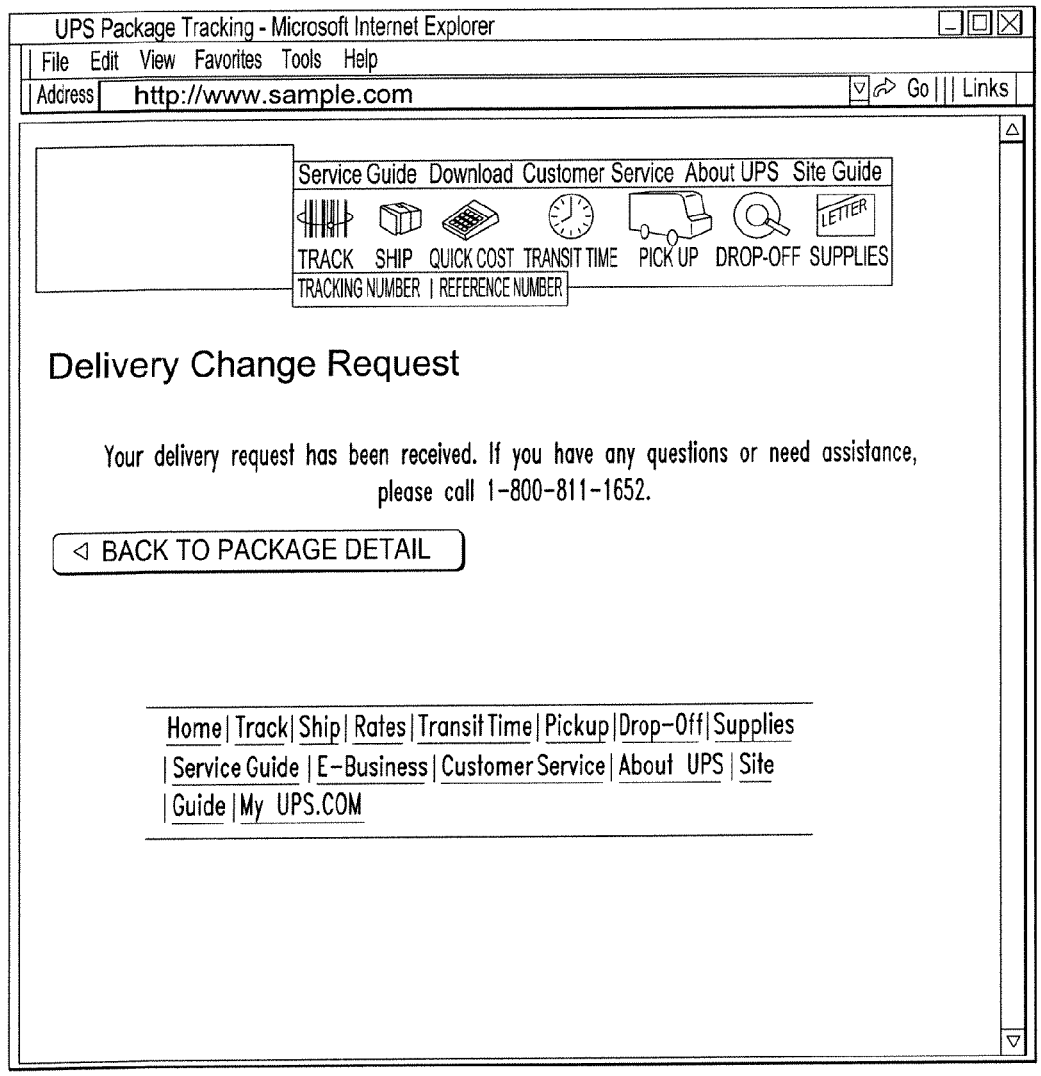

FIG. 10C illustrates an exemplary screen-shot of a web page in an embodiment of the invention that indicates and confirms that the customer has successfully completed a Delivery Change Request when making a request through an Internet system for a parcel to be shipped to an alternate location.

Figure 10D:
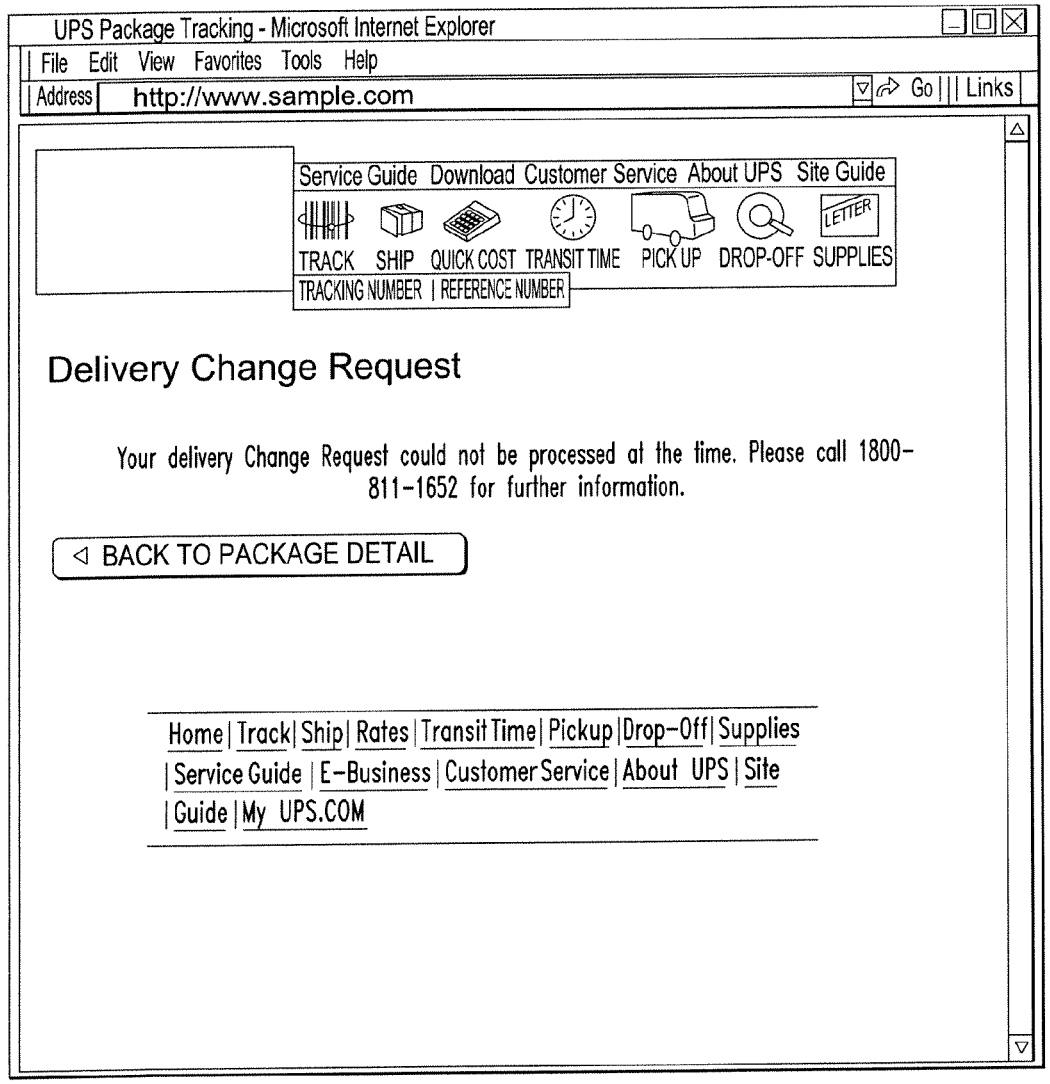

FIG. 10D illustrates an exemplary screen-shot of a web page in an embodiment of the invention that indicates that the customer has unsuccessfully submitted a Delivery Change Request when making a request through an Internet system for the package to be shipped to an alternate location.

FIG. 11 illustrates a process 800 under an embodiment of the present invention in which the tracking system 10 is facilitated through the use of the internet.

At step 801, the customer begins access to the tracking system 10 by use of www.ups.com, or www.myups.com, or any other suitable website or address on a network.

At step 803, the customer selects a particular tracking feature within the overall website.

At step 805, the customer enters the pick up notice code 22 which the customer read from the notice 20 (which in the case described above was 9110987654321), and selects the necessary icon or other selection to send the pick up notice code 22 to the tracking system 10.

At step 807, the tracking system checks a database for delivery addresses.

At step 810, the tracking system checks a database for customer records.

At step 812, the tracking system presents certain information to the customer such as the information set forth in FIGS. 6-10D. At this point, the customer may need no further information, such as in the case where the customer is aware of the time for the next pick up attempt. If this is the case, the customer will pass through steps 820, 824, 826, and 830, in many cases simply by moving to another web page or by logging off the Internet.

However, it may be possible that the customer would like to transport the parcel(s) not picked up to a service center or retail mail facility (e.g., The UPS Store) where the parcel(s) will be conformed to the delivery service's business rules and shipped, instead of waiting for the next pick up attempt. In this case, step 814 allows the customer to execute a cancel pick up instruction to the tracking system 10. If the customer needs directions to the service center or retail mail facility, step 818 allows for a web-based search and location function, based upon, for example, the customer's ZIP code.

Step 816 is a step which includes the use of a IS (information systems) tool which allows the customer (through adequate protection and authorization) to modify the records of the tracking system 10 relative to the item. In this case, if a "cancel pick up" instruction is placed on the item, the item will be brought to a service center or retail mail facility and step 816 modifies the records of the tracking system 10 to so reflect this instruction.

If the customer wants a return pick up for the package at a location different from the original pick up location at decision step 820, step 822 is selected, which allows for the records of the tracking system 10 to so reflect this instruction whereby a customer (shipper) can designate the pick up of the package at a different location and/or time than currently scheduled.

Furthermore, if one or more parcels that are associated with the pick up notice code have been picked up by the delivery service, the customer may want to have one or more of the parcels shipped to a location alternate from the original "ship to" address. If the customer wants to return the package (to the shipper) or wants to attend to alternate delivery at step 824, step 822 is selected, which as discussed above, allows for the records of the tracking system 10 to so reflect this instruction.

If at decision step 826 the customer wishes to enter another notice code, the customer is redirected to step 803. If not, the process is over (step 830).

The 1(800) Connection

As noted elsewhere, the customer will have a 1(800) telephone number provided by the pick up notice. Speech recognition software, interactive voice recognition software (IVR), or prompts for entry of telephone keypad signals can allow a customer to have the delivery service expect the parcel to be transported to a local delivery center or retail mail facility by the customer or his/her agent, to allow the customer to cancel the pick up, or to allow the customer to request future pick up or to change the scheduled pick up location and/or time. However, if a "delivery change request" or another relatively complex request is made, the customer will likely be opted out to a live operator in order to attend to such matters.

Reference is now made to FIG. 12, which is a flow chart of a process 900 in an embodiment of the invention where the pick up notice is used by the customer in order to access a toll free number such as a "1-800" number.

The first step in process 900 is step 901, in which the customer dials the toll free number and is connected. Typically the toll free number will be found on the pick up notice.

If the customer wishes to speak to a live operator, step 902 is executed, and full visibility tracking is provided to the customer at step 904. This brings up information such as shown in FIGS. 6-10D, but also additional information in the system which the operator deems needed. If full visibility tracking is not needed, step 907 is reached.

If the customer does not elect to opt out of automatic features, the process goes to step 903.

At step 903, a process begins which requests the customer to speak their notice code such as "please speak your notice code clearly at the beep," or the customer is prompted to enter the notice code into the telephone's keypad.

At step 905, the instructions given by the customer are interpreted and converted into information, which includes the notice code. The system then has the notice code and proceeds to provide information relative thereto as described herein.

At step 907, the tracking system checks a database for delivery addresses.

At step 910, the tracking system checks a database for customer records.

At step 912, the tracking system (through an automated menu-based response system) presents certain information to the customer such as the information set forth in FIGS. 6-10D. At this point, the customer may need no further information, such as in the case where the customer is aware of the time for the next pick up attempt. If this is the case, the customer will pass through steps 920, 926, 924, and 930, in many cases simply by hanging up the phone.

However, it may be possible that the customer would like to transport the parcel(s) not picked up to a service center or retail mail facility (e.g., The UPS Store) where the parcel(s) will be conformed to the delivery service's business rules and shipped, instead of waiting for the next pick up attempt. In this case, step 914 allows the customer to execute a cancel pick up instruction to the tracking system 10. If the customer needs directions to the service center, step 916 allows for a telephonic-based search and location function, based upon, for example, the customer's ZIP code.

At step 918, the pick up instructions can be added to the system as discussed elsewhere.

If the customer wants to cancel pick up of the package at decision step 920, step 922 is selected which allows a corresponding update to the system.

If, at step 926, the customer wishes to elect future pick up, pick up at an alternate location or time, designate a new "ship to" location for items picked up, or have a picked up item returned to the shipper/customer, step 928 may be selected to update the system.

If at step 924, the customer is not satisfied, the customer will be routed to step 902 to speak with an operator.

If at step 924, the customer is satisfied, the customer can end the call, generally by hanging up the phone.

Discussion of Terms

It should be understood that the term "scan" should be interpreted generally to mean the machine reading of a machine-readable code. This may include the type of bar code "scanning" in which a user moves a stylus across a bar code, but could also be interpreted to mean the use of a snapshot or other image grab which is then analyzed for bar code or other code presence and decoding as known in the art. It can also include the reading of a radio frequency identification transponder (a/k/a "RFID tag") with an RFID reader, as such are known in the art. In one embodiment, the RFID reader is incorporated into the data acquisition device.

It should be understood that the system contemplates the use of a number (a.k.a. "plurality") of pick up notices, with each of the pick up notices including a machine-readable pick up notice code thereon, and each of said pick up notice codes being unique within the number of pick up notices used at least with respect to a subset of pick ups. This is not to say that the same pick up notice code may never be re-used, but it is contemplated that the same pick up notice code would not be used for some amount of time to preclude the possibility of confision.

It should be understood that the term "link" is used to denote an association between elements which can later be recalled. An "electronic link" between data includes the linking (with the appropriate linking software) of a "first" type of data (data in a first database field, e.g., pick up notice identification data) with a "second" type of data (data in a second database field, e.g., package identification data), such that the recall of the first type of data, when used with the appropriate linking software, allows for ready recall of the second type of data.

Alternatives

Note that the data acquisition device shown is used as an example, other data acquisition devices may be used under the invention.

CONCLUSION

While this invention has been described in specific detail with reference to the disclosed embodiments, it will be understood that many variations and modifications may be effected within the spirit and scope of the invention as described in the appended claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for picking up one or more unique items from a shipper each item having a unique identity and each having a different machine-readable item code readable therefrom, said system comprising;
   A) a plurality of pick up notices, each of said pick up notices including a machine-readable pick up notice code thereon, each of said pick up notice codes being unique within said plurality of pick up notices;
   B) a code-reading device configured to read said machine-readable pick up notice code from one of said pick up notices as well as to read said machine-readable item code from each of said one or more items, such that a pick up notice code is read and one or more item codes are read; and
   C) a code storing and linking device, said device configured to store said pick up notice code and said one or more item codes and also configured to provide a link between said pick up notice code and said one or more item codes.

2. A system for picking up one or more unique items from a shipper each item having a unique identity and each having a different machine-readable item code readable therefrom, said system comprising;
   A) a plurality of pick up notices, each of said pick up notices including a machine-readable pick up notice code thereon, each of said pick up notice codes being unique within said plurality of pick up notices;
   B) a code-reading and storing device configured to read said machine-readable pick up notice code from one of said pick up notices, configured to read said machine-readable item code from each of said one or more items, and configured to store said pick up notice code and said one or more item codes; and
   C) a storing and serving device configured to receive information relating to said pick up notice code and said one or more item codes from said code-reading and storing device, said storing and serving device also configured to provide information upon request relating to said one or more items, said information including a status that indicates whether each of the one or more items was left behind or picked up, upon the receipt of information relating to said pick up notice.

3. The system as claimed in claim 2, wherein said storing and service device is configured to receive and provide said information via an Internet connection.

4. A system for picking up one or more unique items each item having a unique identity and each having a different machine-readable item code readable therefrom, said system comprising;
   A) a plurality of pick up notices, each of said pick up notices including a machine-readable pick up notice code thereon, each of said pick up notice codes being unique within said plurality of pick up notices;
   B) a code-reading and storing device configured to read said machine-readable pick up notice code from one of said pick up notices, configured to read said machine-readable item code from each of said one or more items, and configured to store said pick up notice code and said one or more item codes; and
   C) a storing linking and serving device configured to receive information relating to said pick up notice code and said one or more item codes from said code-reading and storing device, said storing linking and serving device also configured to link said pick up notice code relative to said one or more item codes to allow it to provide information upon request relating to said one or more unique items, said information including a status that indicates whether each of the one or more items was left behind or picked up, upon the receipt of information relating to said pick up notice.

5. The system as claimed in claim 4, wherein said storing and service device is configured to receive and provide said information via an Internet connection.

6. A system for picking up one or more unique items from a shipper each item having a unique identity and each having a different machine-readable item code readable therefrom, said system comprising;
   A) a plurality of pick up notices, each of said pick up notices including a first machine-readable pick up notice code and a second human-readable pick up notice code thereon, each of said pick up notice codes being unique within said plurality of pick up notices;
   B) a code-reading device configured to read said machine-readable pick up notice code from one of said pick up notices, and also configured to read said machine-readable item code from each of said one or more items;
   C) a code-storing device configured to store said pick up notice code and said one or more item codes; and
   D) a linking device configured to link said pick up notice relative to said one or more items; and
   E) a reporting device configured to report information regarding each of said one or more unique items, said information including a status that indicates whether each of the one or more unique items was left behind or picked up, in response to receipt of said second human-readable notice code.

7. The system as claimed in claim 6, wherein said reporting device comprises a computer server configured to store data associated with said machine-readable pick up notice code from one of said pick up notices, and also configured to store data associated with said machine-readable item code.

8. The system as claimed in claim 6, wherein said reading in step "B" is done by scanning.

9. The system as claimed in claim 6, wherein said linking in step "D" is done electronically.

10. A method for picking up one or more unique items from a shipper each item having a unique identity and each having a different machine-readable item code readable therefrom, said method including the steps of:
    A) providing a plurality of pick up notices, each of said pick up notices including a machine-readable pick up notice code thereon, each of said pick up notice codes being unique within said plurality of pick up notices;
    B) machine reading said machine-readable pick up notice code from one of said pick notices and storing corresponding electronic data associated with said machine-readable pick up notice code;
    C) machine reading said machine-readable item code from each of said one or more items, and storing electronic data associated with said one or more items, said electronic data associated with said one or more items including a status that indicates whether each of said one or more items was picked up by the carrier; and
    D) electronically linking said electronic data associated with said machine-readable pick up notice code with said electronic data associated with said one or more items.

11. A method for picking up one or more unique items from a shipper each item having a unique identity and each having a different machine-readable item code readable therefrom, said method including the steps of:
    A) providing a plurality of pick up notices, each of said pick up notices including a machine-readable pick up notice code thereon, each of said pick up notice codes being unique within said plurality of pick up notices;
    B) machine reading said machine-readable pick up notice code from one of said pick up notices and storing corresponding electronic data associated with said machine-readable pick up notice code;
    C) machine reading said machine-readable item code from each of said one or more items, and storing electronic data associated with said one or more items; and
    D) electronically linking said electronic data associated with said machine-readable pick up notice code with said electronic data associated with said one or more items; and
    E) reporting information regarding each of said one or more unique items in response to receipt of a description of said one of said pick up notices, said information including a status that indicates whether each of said one or more items was picked up by the carrier.

12. The method of claim 11, wherein in step "E", said receipt of a description of said one of said pick up notices is accomplished at least in part by use of the internet, and wherein said reporting of said information regarding each of said one or more unique items is accomplished at least in part by use of the internet.

13. A method for picking up one or more unique items each having unique identities and each having a different machine-readable item code readable therefrom, said method including the steps of:
    A) providing a plurality of pick up notices, each of said pick up notices including a machine-readable first pick up notice code and a human-readable second pick up notice code thereon, each of said first pick up notice codes being unique within said plurality of pick up notices;
    B) machine reading said machine-readable pick up notice code from one of said pick up notices and storing corresponding electronic data associated with said machine-readable pick up notice code;

C) machine reading said machine-readable item code from each of said one or more items, and storing electronic data associated with said one or more items;

D) electronically linking said electronic data associated with said machine-readable pick up notice code with said electronic data associated with said one or more items; and E) reporting information regarding each of said one or more unique items in response to receipt of said human-readable second pick up notice code, said information including a status that indicates whether each of said one or more items was picked up by the carrier.

14. The method of claim 13, wherein in step "E", said receipt of said human-readable second pick up notice code is accomplished at least in part by use of the internet, and wherein said reporting of said information regarding each of said one or more unique items is accomplished at least in part by use of the internet.

15. The method of claim 13, wherein in step "A", said machine-readable first pick up notice code includes common data relative to said human-readable second pick up notice code.

16. The method of claim 13, wherein said human-readable indicia is an alphanumeric sequence.

17. A method for picking up one or more unique items from one or more shippers each item having a unique identity and each having a different machine-readable item code readable therefrom, said method including the use of a handheld data acquisition device and comprising the steps of:

A) providing a plurality of pick up notices, each of said pick up notices including a machine-readable pick up notice code thereon, each of said pick up notice codes being unique within said plurality of pick up notices;

B) machine reading said machine-readable pick up notice code from one of said pick up notices and storing corresponding electronic data associated with said machine-readable pick up notice code on said handheld data acquisition device;

C) machine reading said machine-readable item code from each of said one or more items, and storing electronic data associated with said one or more items on said handheld data acquisition device;

D) electronically linking said electronic data associated with said machine-readable pick up notice code with said electronic data associated with said one or more items; and E) reporting information regarding each of said one or more unique items in response to receipt of a description of said one of said pick up notices, said information including a status that indicates whether each of said one or more items was picked up by the carrier.

18. The method of claim 17, wherein in step "E", said receipt of a description of said one of said pick up notices is accomplished at least in part by use of the internet, and wherein said reporting of said information regarding each of said one or more unique items is accomplished at least in part by use of the internet.

19. The method of claim 17, wherein in step "D", said linking is done on said handheld data acquisition device.

20. A method for picking up one or more unique items from a shipping location each item having a unique identity and each having a different machine-readable item code readable therefrom, said method including the use of a handheld data acquisition device and a computer server and comprising the steps of:

A) providing a plurality of pick up notices, each of said pick up notices including a machine-readable pick up notice code thereon, each of said pick up notice codes being unique within said plurality of pick up notices;

B) machine reading said machine-readable pick up notice code from one of said pick up notices and storing corresponding electronic data associated with said machine-readable pick up notice code on said handheld data acquisition device;

C) machine reading said machine-readable item code from each of said one or more items, and storing electronic data associated with said one or more items on said handheld data acquisition device;

D) transferring said electronic data associated with said machine-readable pick up notice code from said handheld data acquisition device to said server as well as transferring said electronic data associated with said one or more items from said handheld data acquisition device to said server;

E) electronically linking said electronic data on said server associated with said machine-readable pick up notice code with said electronic data on said server associated with said one or more of items; and F) reporting information regarding each of said one or more items in response to receipt of a description of said one of said pick up notices, said information including a status for each of said one or more items indication whether said item was picked up from the pick up location.

21. The method of claim 20, wherein in step "F", said receipt of a description of said one of said pick up notices is accomplished at least in part by use of the internet, and wherein said reporting of said information regarding each of said one or more items is accomplished at least in part by use of the internet.

22. A method for picking up, from a shipping location, one or more unique items each having a unique identity and each having a different machine-readable item code readable therefrom, said method including the steps of:

A) providing a plurality of pick up notices, each of said pick up notices including a machine-readable pick up notice code thereon, each of said pick up notice codes being unique within said plurality of pick up notices;

B) attempting the pick up of said one or more unique items at the shipping location under a set of predetermined business rules;

C) picking up each of said items if each said item meets said business rules;

D) leaving each of said one or more items at said shipping location if said item does not meet said business rules;

E) machine reading said machine-readable pick up notice code from one of said pick up notices and storing corresponding electronic data associated with said machine-readable pick up notice code;

F) machine reading said machine-readable item code from each of said one or more items, and storing electronic data associated with said one or more items;

G) electronically linking said electronic data associated with said machine-readable pick up notice code with said electronic data associated with said machine-readable item code from each of said one or more items;

H) reporting information regarding each of said one or more items in response to receipt of a description of said one of said pick up notices from a shipper, said information including a status for each of said one or more items indication whether said item was picked up from the pick up location; and I) modifying pick up plans for one or more items each having a status that indicates the items were left at said shipping location based upon subsequent instructions from said shipper.

23. The method of claim 22, wherein in step "G", linking is provided on a computer server.

24. The method of claim 22, wherein in step "G", linking is first provided on a handheld device and then transferred to a computer server where said linking is again provided on said server.

25. The method of claim 22, wherein in step "H", said receipt of a description of said one of said pick up notices is accomplished at least in part by use of the internet, and wherein said reporting of said information regarding each of said one or more unique items is accomplished at least in part by use of the internet.

26. The method of claim 22, wherein in step "H", said receipt of a description of said one of said pick up notices is accomplished at least in part by use of a telephone connection, and wherein said reporting of said information regarding each of said one or more unique items is accomplished at least in part by use of a telephone connection.

* * * * *